US012368825B2

(12) United States Patent
Shimada et al.

(10) Patent No.: US 12,368,825 B2
(45) Date of Patent: Jul. 22, 2025

(54) CONTROL APPARATUS, CONTROL METHOD, AND PROGRAM

(71) Applicant: FUJIFILM Corporation, Tokyo (JP)

(72) Inventors: Tomoharu Shimada, Saitama (JP); Masahiko Sugimoto, Saitama (JP); Tetsuya Fujikawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 88 days.

(21) Appl. No.: 18/464,257

(22) Filed: Sep. 10, 2023

(65) Prior Publication Data

US 2023/0421731 A1    Dec. 28, 2023

Related U.S. Application Data

(63) Continuation of application No. PCT/JP2022/002054, filed on Jan. 20, 2022.

(30) Foreign Application Priority Data

Mar. 24, 2021   (JP) ................................ 2021-050783

(51) Int. Cl.
*G06T 7/70*     (2017.01)
*G06V 10/82*    (2022.01)
(Continued)

(52) U.S. Cl.
CPC ............... *H04N 7/183* (2013.01); *G06T 7/70* (2017.01); *H04N 23/667* (2023.01); *H04N 23/695* (2023.01); *G06T 2207/20081* (2013.01)

(58) Field of Classification Search
CPC .................. G06T 7/70; G06T 2207/20; G06T 2207/20081; G06V 10/25; G06V 10/82;
(Continued)

(56) References Cited

U.S. PATENT DOCUMENTS 11,729,487 B2    8/2023  Wakamatsu et al.
2004/0119819 A1  6/2004  Aggarwal et al.
(Continued)

FOREIGN PATENT DOCUMENTS

JP    2004056473    2/2004
JP    2006523043    10/2006
(Continued)

OTHER PUBLICATIONS

"International Search Report (Form PCT/ISA/210) of PCT/JP2022/002054", mailed on Mar. 22, 2022, with English translation thereof, pp. 1-5.
"Written Opinion of the International Searching Authority (Form PCT/ISA/237) of PCT/JP2022/002054", mailed on Mar. 22, 2022, with English translation thereof, pp. 1-8.

*Primary Examiner* — Daquan Zhao
(74) *Attorney, Agent, or Firm* — JCIPRNET

(57) ABSTRACT

A control apparatus includes a processor that controls a surveillance camera. The processor enables switching between a first surveillance mode in which the surveillance camera is caused to perform imaging to acquire a first captured image and an imaging range is changed according to a given instruction, and a second surveillance mode in which the surveillance camera is caused to perform imaging to acquire a second captured image, a trained model that has been trained through machine learning is used to detect an object that appears in the second captured image, and the imaging range is changed according to a detection result, and outputs the first captured image acquired in the first surveillance mode as a teacher image for the machine learning.

16 Claims, 18 Drawing Sheets

(51) Int. Cl.
*H04N 7/18* (2006.01)
*H04N 23/667* (2023.01)
*H04N 23/695* (2023.01)
*G06V 20/52* (2022.01)
*G06V 20/70* (2022.01)

(58) Field of Classification Search
CPC ........ G06V 20/52; G06V 20/70; G06V 20/00; H04N 23/661; H04N 23/667; H04N 23/695; H04N 5/77; H04N 5/92; H04N 7/18; H04N 7/183; H04N 2101/00
USPC ...... 386/242, 239, 224, 223; 348/61, 63, 64, 348/73
See application file for complete search history.

(56) References Cited

U.S. PATENT DOCUMENTS

| | | | |
|---|---|---|---|
| 2007/0115358 A1* | 5/2007 | McCormack | ........ G08B 13/196 348/159 |
| 2010/0013917 A1 | 1/2010 | Hanna et al. | |
| 2018/0204053 A1 | 7/2018 | Yokozeki et al. | |
| 2019/0199917 A1 | 6/2019 | Kadoi | |
| 2020/0228692 A1 | 7/2020 | Wakamatsu et al. | |

FOREIGN PATENT DOCUMENTS

| | | |
|---|---|---|
| JP | 2009516480 | 4/2009 |
| JP | 2018117280 | 7/2018 |
| JP | 2019106694 | 6/2019 |
| JP | 2020061761 | 4/2020 |

* cited by examiner

FIG. 4
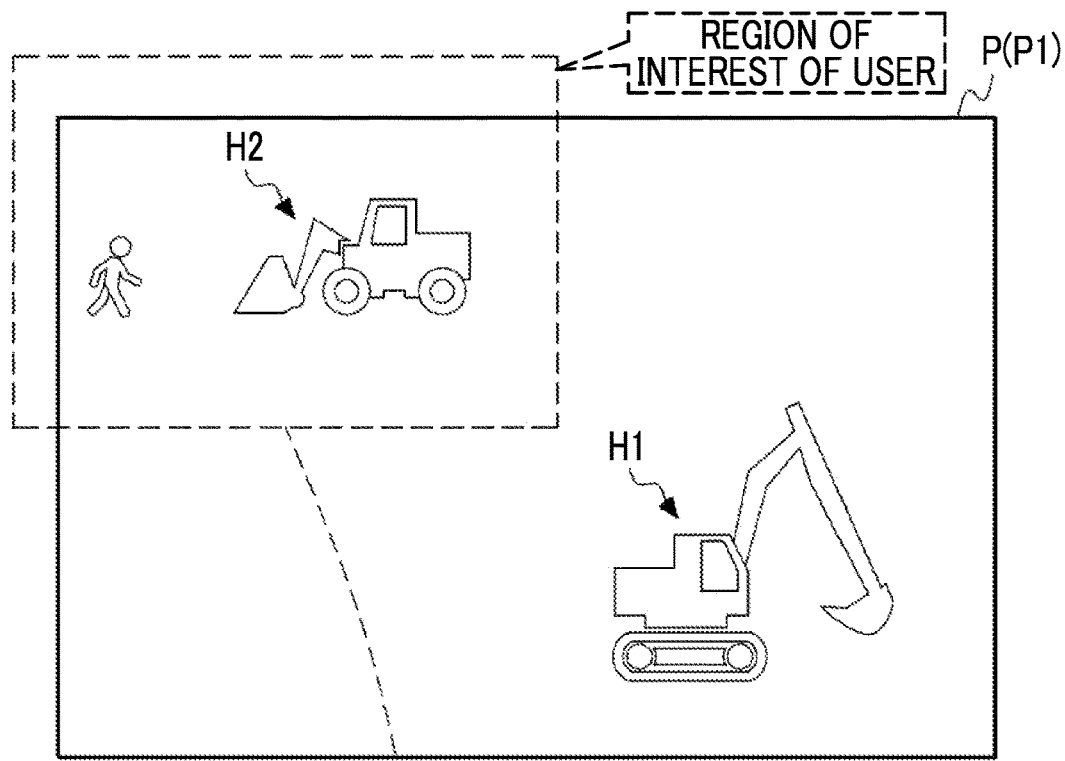
 
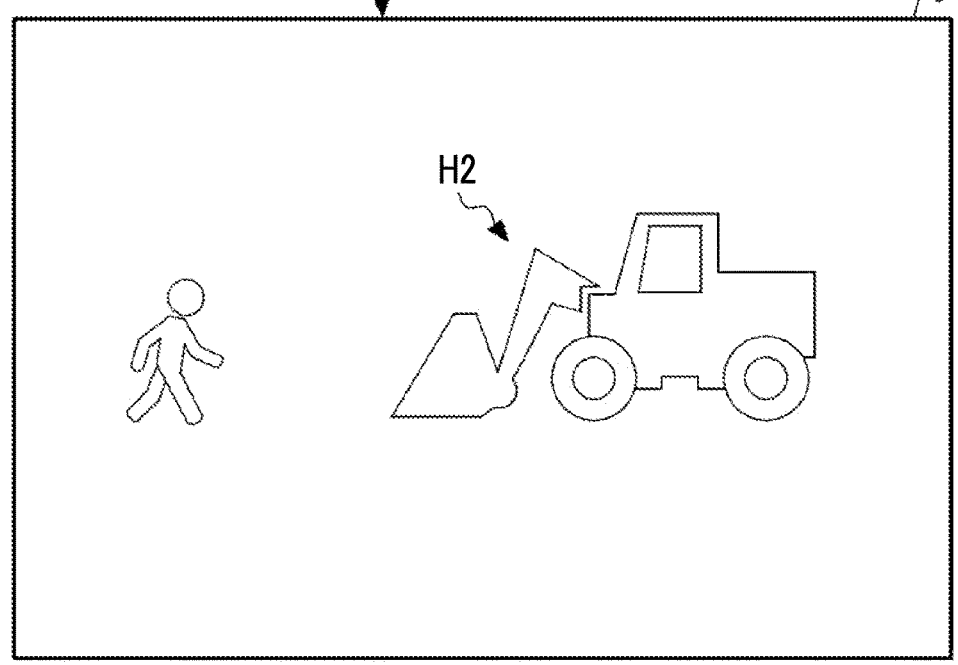

FIG. 6
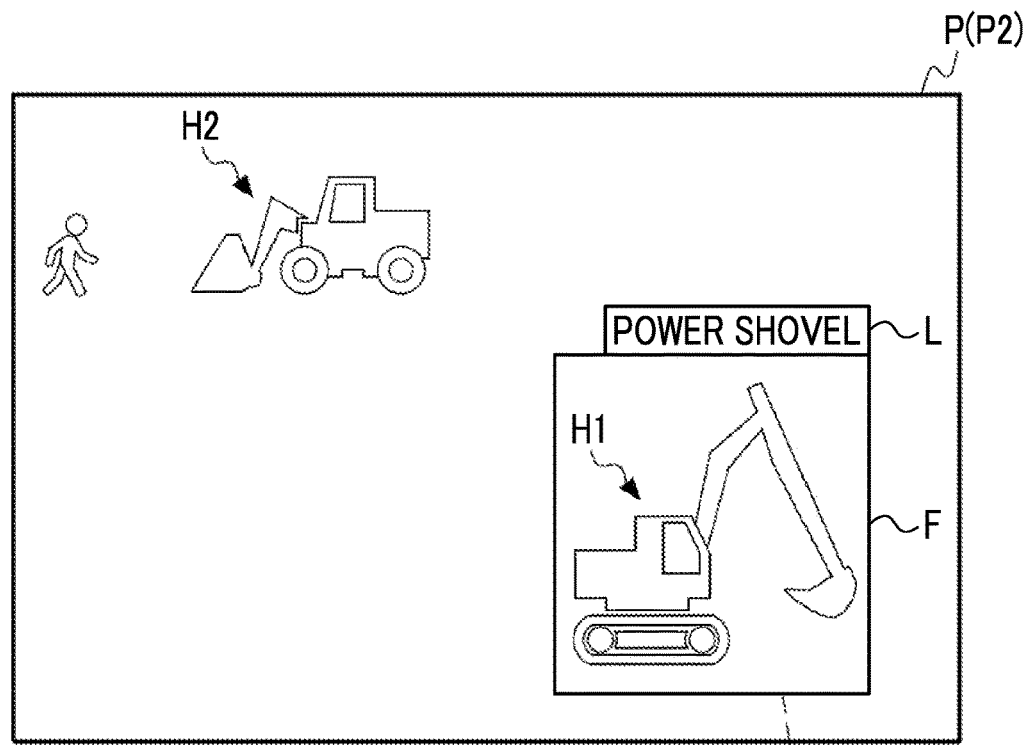
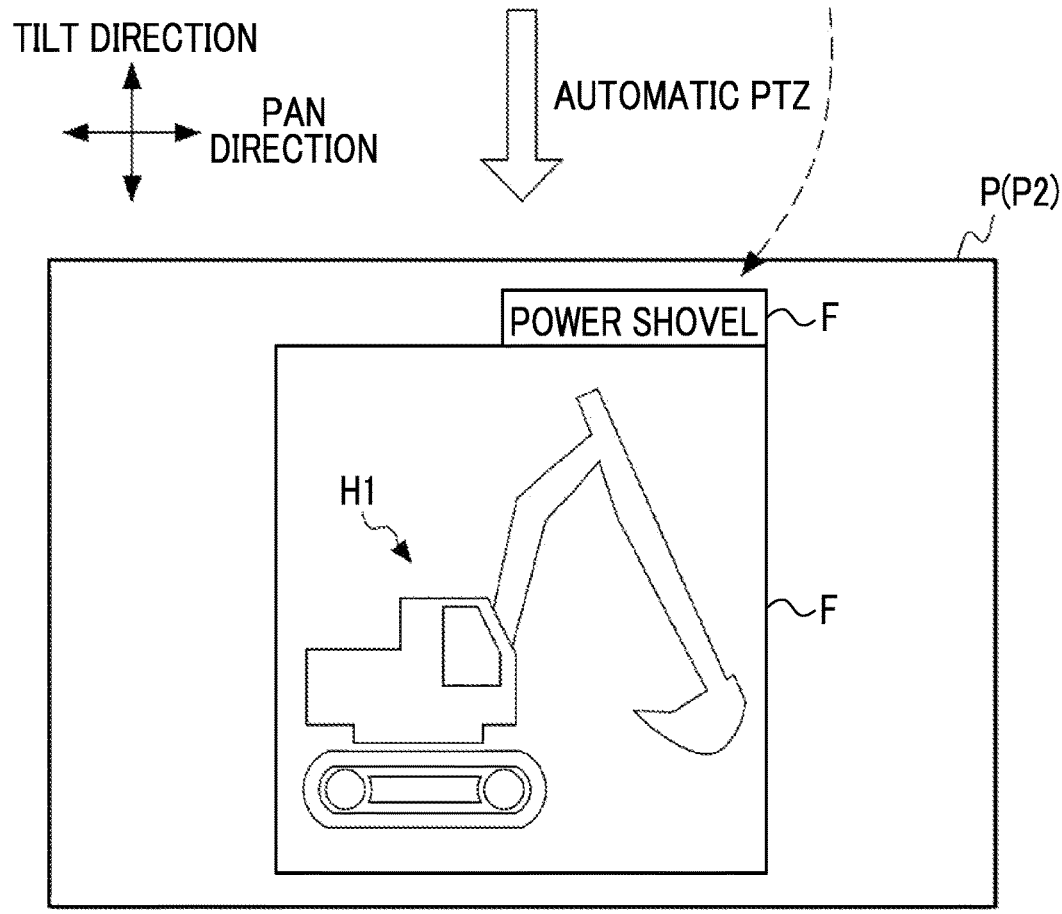

FIG. 7
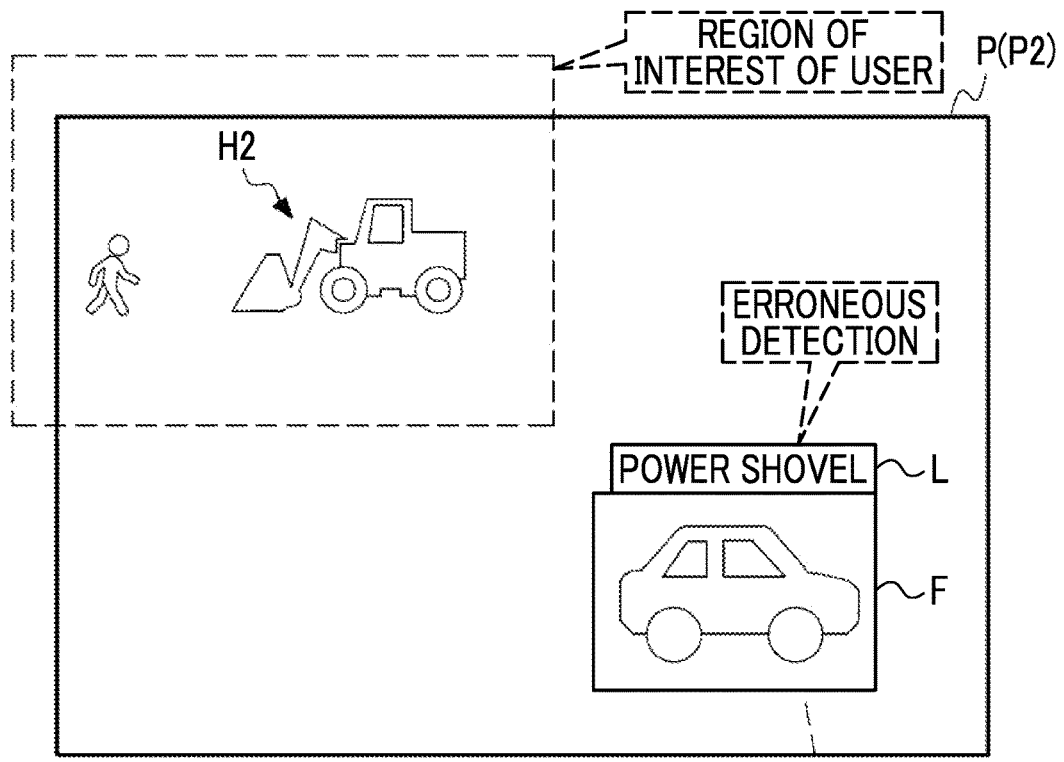
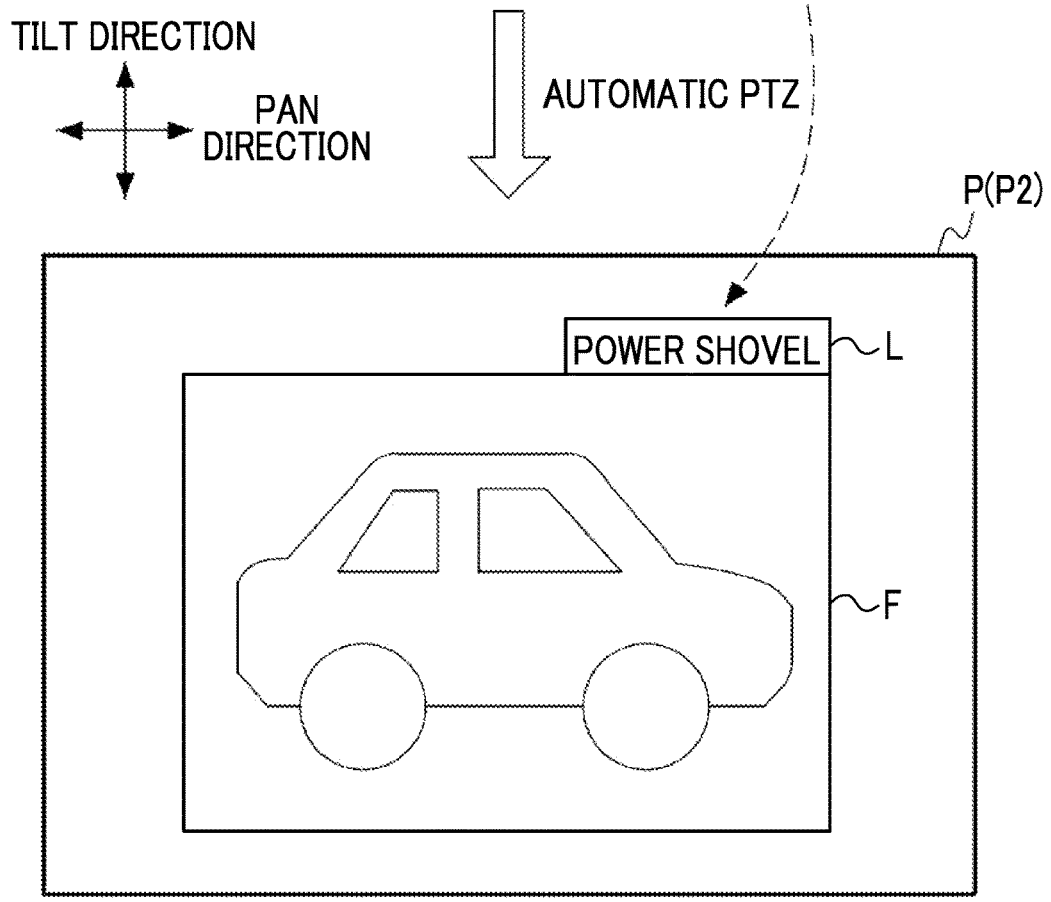

CONTROL APPARATUS, CONTROL METHOD, AND PROGRAM

CROSS-REFERENCE TO RELATED APPLICATION

This application is a continuation application of International Application No. PCT/JP2022/002054, filed Jan. 20, 2022, the disclosure of which is incorporated herein by reference in its entirety. Further, this application claims priority from Japanese Patent Application No. 2021-050783 filed on Mar. 24, 2021, the disclosure of which is incorporated herein by reference in its entirety.

BACKGROUND

1. Technical Field

The technology of the present disclosure relates to a control apparatus, a control method, and a program.

2. Description of the Related Art

JP2004-056473A describes that a surveillance control apparatus is provided with a neural network (NW) that outputs recognition information corresponding to an image captured by a camera based on a learning result, a control unit that performs control based on the recognition information, a short-term storage unit that transitorily stores image data, and a storage unit that records the image data, the NW learns a relationship between the image and a degree of urgency of an event represented by the image and recognizes the degree of urgency corresponding to the image of the camera, and the control unit controls a frame rate of the image data recorded in the storage unit based on the recognition information of the NW.

JP2006-523043A describes that a method of detecting a moving object and controlling a surveillance system includes a processing module adapted to receive image information from at least one image forming sensor. The surveillance system executes a motion detection analysis on a captured image and controls a camera in a specific manner in a case in which the moving object is detected.

A method and a system for a video surveillance system described in JP2009-516480A comprise a plurality of video cameras comprising individual visual fields, in which the camera is configured to perform at least one of a zoom for changing a camera visual field, a tilt for rotating the camera about a horizontal tilt axis, or a pan for rotating the camera about a vertical pan axis. The system further comprises a processor configured to receive a signal representing an image in the visual field of at least one video camera, recognize a target by using the received signal, decide a direction from the camera that recognizes the target to the target, and transmit the decided direction to the other camera among the plurality of video cameras.

SUMMARY

One embodiment according to the technology of the present disclosure provides a control apparatus, a control method, and a program which can efficiently collect a teacher image used for machine learning.

The present disclosure relates to a control apparatus comprising a processor that controls a surveillance camera, in which the processor performs switching between a first surveillance mode in which the surveillance camera is caused to perform imaging to acquire a first captured image and an imaging range is changed according to a given instruction, and a second surveillance mode in which the surveillance camera is caused to perform imaging to acquire a second captured image, a trained model that has been trained through machine learning is used to detect an object that appears in the second captured image, and the imaging range is changed according to a detection result, and outputs the first captured image acquired in the first surveillance mode as a teacher image for the machine learning.

It is preferable that the processor outputs the first captured image as the teacher image according to a manual operation performed with respect to the surveillance camera.

It is preferable that the manual operation is a switching operation from the second surveillance mode to the first surveillance mode, and the processor outputs the first captured image acquired in the first surveillance mode after switching from the second surveillance mode to the first surveillance mode as the teacher image.

It is preferable that the surveillance camera is able to change the imaging range by changing at least one of a pan, a tilt, or a zoom, and the switching operation is an operation of changing at least one of the pan, the tilt, or the zoom in the second surveillance mode.

It is preferable that the processor outputs the first captured image as the teacher image according to a given output instruction after switching from the second surveillance mode to the first surveillance mode.

It is preferable that the processor outputs the second captured image acquired in the second surveillance mode before switching as the teacher image by adding a determination result that is not suitable for detection of the object to the second captured image, and outputs the first captured image acquired in the first surveillance mode after switching as the teacher image by adding a determination result that is suitable for detection of the object to the first captured image.

It is preferable that, in a case in which an operation is not performed for a certain time in the first surveillance mode after switching from the second surveillance mode to the first surveillance mode, the processor performs switching to the second surveillance mode.

It is preferable that, in a case in which the manual operation is performed after elapse of a certain time from a previous manual operation after switching from the first surveillance mode to the second surveillance mode, the processor does not output the second captured image as the teacher image.

It is preferable that the processor detects an object that appears in the teacher image, and adds positional information of the detected object in the teacher image to the teacher image.

It is preferable that the processor makes a detection standard for object detection in a case of detecting the object that appears in the teacher image lower than a detection standard for object detection in a case of detecting the object that appears in the second captured image.

It is preferable that the processor performs a positional information change process of changing the positional information according to a given instruction.

It is preferable that the processor decides a position of an object that appears in the teacher image according to a given instruction, and adds positional information of the decided object in the teacher image to the teacher image.

It is preferable that the processor outputs an expansion image generated by performing an expansion process with respect to the teacher image as the teacher image, in addition to the teacher image.

It is preferable that the expansion process is at least any one process of inversion, reduction, addition of noise, or style change using deep learning.

The present disclosure relates to a control method comprising enabling switching between a first surveillance mode in which a surveillance camera is caused to perform imaging to acquire a first captured image and an imaging range is changed according to a given instruction, and a second surveillance mode in which the surveillance camera is caused to perform imaging to acquire a second captured image, a trained model that has been trained through machine learning is used to detect an object that appears in the second captured image, and the imaging range is changed according to a detection result, and outputting the first captured image acquired in the first surveillance mode as a teacher image for the machine learning.

The present disclosure relates to a program causing a computer to execute a process comprising enabling switching between a first surveillance mode in which a surveillance camera is caused to perform imaging to acquire a first captured image and an imaging range is changed according to a given instruction, and a second surveillance mode in which the surveillance camera is caused to perform imaging to acquire a second captured image, a trained model that has been trained through machine learning is used to detect an object that appears in the second captured image, and the imaging range is changed according to a detection result, and outputting the first captured image acquired in the first surveillance mode as a teacher image for the machine learning.

BRIEF DESCRIPTION OF THE DRAWINGS

Exemplary embodiments according to the technique of the present disclosure will be described in detail based on the following figures, wherein:

FIG. 4 is a conceptual diagram showing an example of a manual PTZ in a manual surveillance mode, FIG. 6 is a conceptual diagram showing an example of an automatic PTZ in an automatic surveillance mode, FIG. 7 is a conceptual diagram showing an example in which an object is erroneously detected in the automatic surveillance mode.

DETAILED DESCRIPTION

Hereinafter, examples of a control apparatus, a control method, and a program according to the technology of the present disclosure will be described with reference to the accompanying drawings.

First, the terms used in the following description will be described.

CPU refers to an abbreviation of "Central Processing Unit". NVM refers to an abbreviation of "Non-volatile memory". RAM refers to an abbreviation of "Random Access Memory". IC refers to an abbreviation of "Integrated Circuit". ASIC refers to an abbreviation of "Application Specific Integrated Circuit". PLD refers to an abbreviation of "Programmable Logic Device". FPGA refers to an abbreviation of "Field-Programmable Gate Array". SoC refers to an abbreviation of "System-on-a-chip". SSD refers to an abbreviation of "Solid State Drive". USB refers to an abbreviation of "Universal Serial Bus". HDD refers to an abbreviation of "Hard Disk Drive". EEPROM refers to an abbreviation of "Electrically Erasable and Programmable Read Only Memory". EL refers to an abbreviation of "Electro-Luminescence". I/F refers to an abbreviation of "Interface". CMOS refers to an abbreviation of "Complementary Metal Oxide Semiconductor". CCD refers to an abbreviation of "Charge Coupled Device".

SWIR refers to an abbreviation of "Short Wave Infra-Red". LAN refers to an abbreviation of "Local Area Network".

First Embodiment

Figure 1:
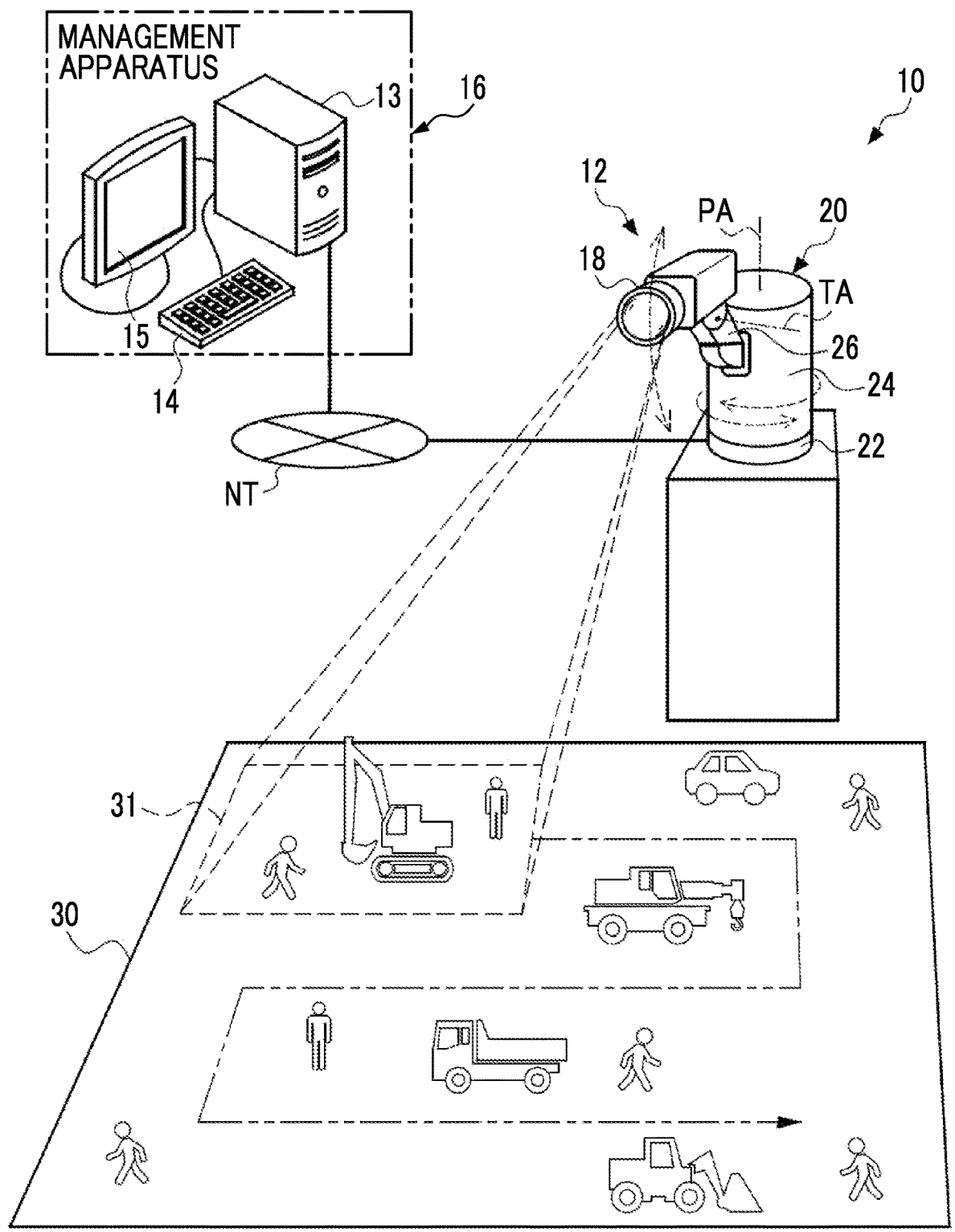
FIG. 1 is a schematic configuration diagram showing an example of an overall configuration of a surveillance system according to a first embodiment.

As an example, as shown in FIG. 1, a surveillance system 10 comprises a surveillance camera 12 and a management apparatus 16. The surveillance system 10 is, for example, a system that surveils a construction site. The surveillance camera 12 is installed at a high place, such as a roof of a building in the vicinity of the construction site. The management apparatus 16 is used by, for example, a user, such as a site supervisor who supervises a worker at the construction site. The user surveils, for example, whether or not a danger occurs in the construction site during the work by using the management apparatus 16. The surveillance system 10 is a system for reducing a surveillance burden on the user.

The surveillance camera 12 comprises an imaging apparatus 18 and a revolution apparatus 20. The imaging apparatus 18 images a subject by receiving, for example, light in a visible wavelength range reflected by the subject. It should be noted that the imaging apparatus 18 may image the subject by receiving near-infrared light, which is light in a short-wave infrared wavelength range reflected by the subject. The short-wave infrared wavelength range refers to, for example, a wavelength range of about 900 nm to 2500 nm. Light in the short-wave infrared wavelength range is also generally referred to as SWIR light.

The imaging apparatus 18 is attached to the revolution apparatus 20. The revolution apparatus 20 revolves the imaging apparatus 18. For example, the revolution apparatus 20 changes an imaging direction of the imaging apparatus 18 to a pan direction and a tilt direction. The pan direction is, for example, a horizontal direction. The tilt direction is, for example, a vertical direction.

The revolution apparatus 20 comprises a substrate 22, a pan rotating member 24, and a tilt rotating member 26. The pan rotating member 24 is formed in a columnar shape, and is attached to an upper surface of the substrate 22. The tilt rotating member 26 is formed in an arm shape, and is attached to an outer peripheral surface of the pan rotating member 24. The imaging apparatus 18 is attached to the tilt rotating member 26. The tilt rotating member 26 rotates about a tilt axis TA parallel to the horizontal direction to change the imaging direction of the imaging apparatus 18 to the tilt direction.

The substrate 22 supports the pan rotating member 24 from below. The pan rotating member 24 rotates about a pan axis PA parallel to the vertical direction to change the imaging direction of the imaging apparatus 18 in the pan direction.

A driving source (for example, a pan motor 24A and a tilt motor 26A shown in FIG. 2) is built in the substrate 22. The driving source of the substrate 22 is mechanically connected to the pan motor 24A and the tilt motor 26A. For example, the driving source of the substrate 22 is connected to the pan rotating member 24 and the tilt rotating member 26 via a power transmission mechanism (not shown). The pan rotating member 24 rotates about the pan axis PA by receiving power from the driving source of the substrate 22, and the tilt rotating member 26 rotates about the tilt axis TA by receiving power from the driving source of the substrate 22.

As shown in FIG. 1, the surveillance system 10 generates a captured image by imaging an imaging range 31 set in a surveillance region 30 using the imaging apparatus 18. The surveillance system 10 images the entire surveillance region 30 by performing the pan and the tilt and changing the imaging range 31. Various subjects, such as heavy machines and workers, are present at the construction site as the surveillance region 30. The heavy machines include a power shovel, a bulldozer, a crane truck, a dump truck, and the like.

The imaging apparatus 18 is, for example, a digital camera having an image sensor (not shown). The image sensor receives subject light indicating the subject, performs photoelectric conversion of the received subject light, and outputs an electric signal having a signal level corresponding to the received light amount as image data. The image data output by the image sensor corresponds to the captured image described above. The image sensor is a CMOS type image sensor, a CCD type image sensor, or the like. The imaging apparatus 18 may capture a color image, or may capture a monochrome image. Also, the captured image may be a still image, or may be a moving image.

In addition, the imaging apparatus 18 is provided with a zoom function. The zoom function is a function of reducing or enlarging (that is, zooming in or zooming out) the imaging range 31. The zoom function provided in the imaging apparatus 18 is an optical zoom function by moving a zoom lens, or an electronic zoom function by performing image processing with respect to the image data. It should be noted that the zoom function provided in the imaging apparatus 18 may be a system in which the optical zoom function and the electronic zoom function are combined.

The management apparatus 16 comprises a management apparatus body 13, a reception device 14, and a display 15. The management apparatus body 13 includes a built-in computer 40 (see FIG. 2), and controls the entire surveillance system 10. The reception device 14 and the display 15 are connected to the management apparatus body 13.

The reception device 14 receives various instructions from the user who uses the surveillance system 10. Examples of the reception device 14 include a keyboard, a mouse, and/or a touch panel. The management apparatus body 13 grasps various instructions received by the reception device 14. The display 15 displays various types of information (for example, an image and a text) under the control of the management apparatus body 13. Examples of the display 15 include a liquid crystal display or an EL display.

The surveillance camera 12 is communicably connected to the management apparatus 16 via a communication network NT (the Internet, a LAN, or the like), and operates under the control of the management apparatus body 13. The connection system between the surveillance camera 12 and the management apparatus 16 may be a wired connection system, or may be a wireless connection system.

The management apparatus 16 acquires the captured image output from the imaging apparatus 18 of the surveillance camera 12, and detects a specific object (for example, the heavy machine) that appears in the captured image by using a trained model that has been trained through machine learning. In a case in which the specific object is detected, the management apparatus 16 causes the surveillance camera 12 to perform the pan, the tilt, and the zoom to track the detected object. Hereinafter, an operation of changing the imaging range 31 by the pan, the tilt, and the zoom is referred to as "PTZ". Further, an operation of changing the imaging range 31 according to a detection result of the object that appears in the captured image is referred to as "automatic PTZ".

In addition, the management apparatus 16 enables an operation of changing the imaging range 31 according to an operation of the reception device 14 by the user. Hereinafter, the operation of changing the imaging range 31 according to an instruction given to the reception device 14 is referred to as "manual PTZ". In the manual PTZ, the user can set the imaging range 31 to any position and size in the surveillance region 30 by operating the reception device 14.

Further, hereinafter, a surveillance mode in which the surveillance region 30 is surveilled by the manual PTZ is referred to as a "manual surveillance mode", and a surveillance mode in which the surveillance region 30 is surveilled by the automatic PTZ is referred to as an "automatic surveillance mode". The user can perform a switching operation of switching the surveillance mode by the surveillance system 10 between the manual surveillance mode and the automatic surveillance mode. It should be noted that the manual surveillance mode is an example of a "first surveillance mode" according to the technology of the present disclosure. The automatic surveillance mode is an example of a "second surveillance mode" according to the technology of the present disclosure.

Figure 2:
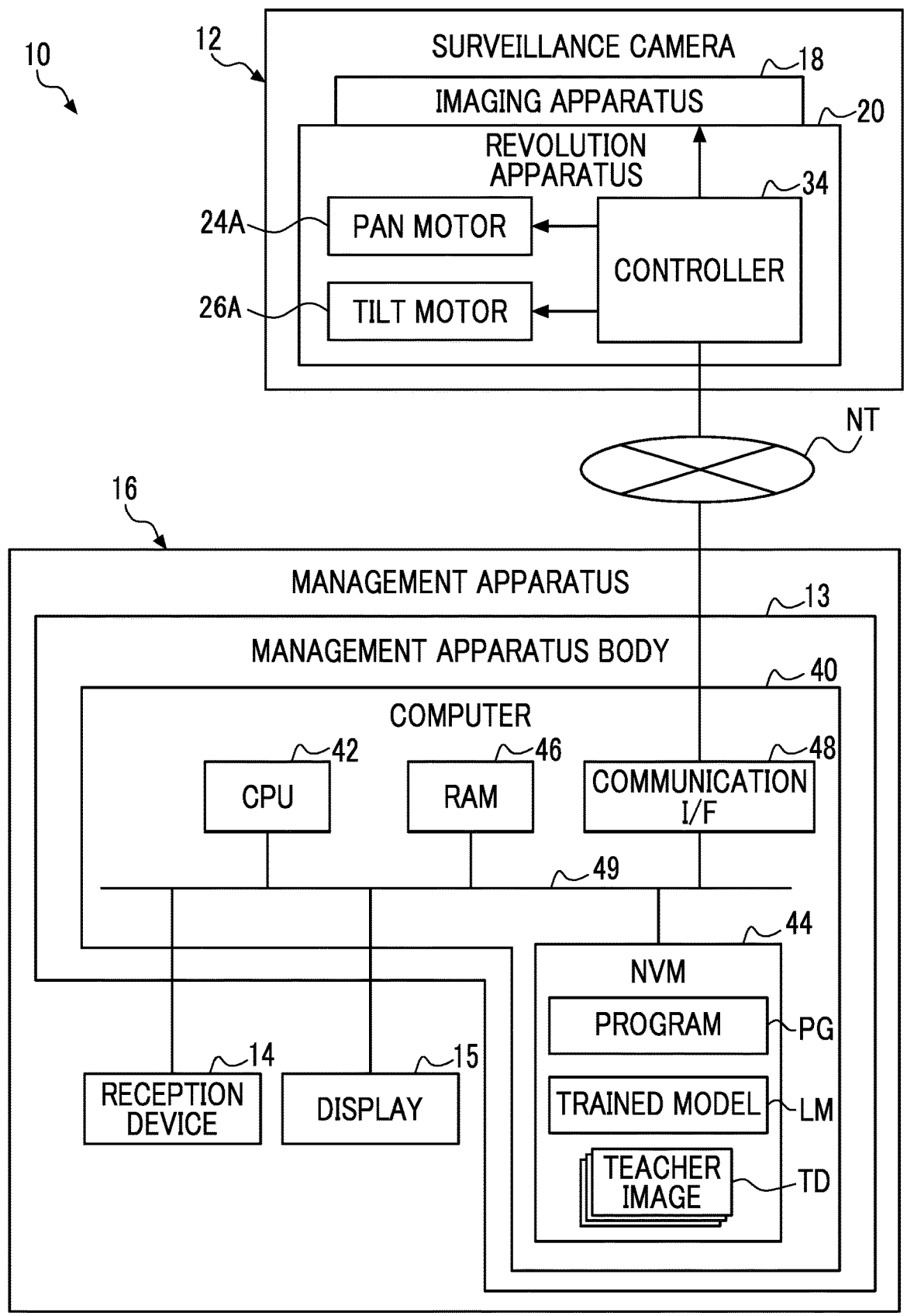
FIG. 2 is a block diagram showing an example of a hardware configuration of a surveillance camera and a management apparatus.

As shown in FIG. 2 as an example, the revolution apparatus 20 of the surveillance camera 12 comprises a controller 34. The controller 34 controls the operations of the pan motor 24A, the tilt motor 26A, and the imaging apparatus 18 under the control of the management apparatus 16.

The management apparatus body 13 of the management apparatus 16 comprises the computer 40. The computer 40 includes a CPU 42, an NVM 44, a RAM 46, and a communication I/F 48. The management apparatus 16 is an example of a "control apparatus" according to the technology of the present disclosure. The computer 40 is an example of a "computer" according to the technology of the present disclosure. The CPU 42 is an example of a "processor" according to the technology of the present disclosure.

The CPU 42, the NVM 44, the RAM 46, and the communication I/F 48 are connected to a bus 49. In the example shown in FIG. 2, for convenience of illustration, one bus is shown as the bus 49, but a plurality of buses may be used. The bus 49 may be a serial bus, or may be a parallel bus including a data bus, an address bus, a control bus, and the like.

Various types of data are stored in the NVM 44. Here, examples of the NVM 44 include various non-volatile storage devices, such as an EEPROM, an SSD, and/or an HDD. The RAM 46 transitorily stores various types of information, and is used as a work memory. Examples of the RAM 46 include a DRAM or an SRAM.

A program PG is stored in the NVM 44. The CPU 42 reads out a necessary program from the NVM 44, and executes the read out program PG on the RAM 46. The CPU 42 controls the entire surveillance system 10 including the management apparatus 16 by executing the process according to the program PG.

The communication I/F 48 is an interface realized by a hardware resource, such as an FPGA. The communication I/F 48 is communicably connected to the controller 34 of the surveillance camera 12 via the communication network NT, and exchanges various types of information between the CPU 42 and the controller 34.

The reception device 14 and the display 15 are also connected to the bus 49, and the CPU 42 operates according to the instruction received by the reception device 14 and displays various types of information on the display 15.

In addition, a trained model LM for performing the object detection described above is stored in the NVM 44. The trained model LM is a trained model for the object detection generated by performing machine learning by using a plurality of teacher images in which the specific object appears. Further, a teacher image TD is stored in the NVM 44. The teacher image TD is a teacher image for additional training for additionally training the trained model LM. The teacher image TD is an image, which satisfies a predetermined condition, among the captured images acquired by the surveillance camera 12.

Figure 3:
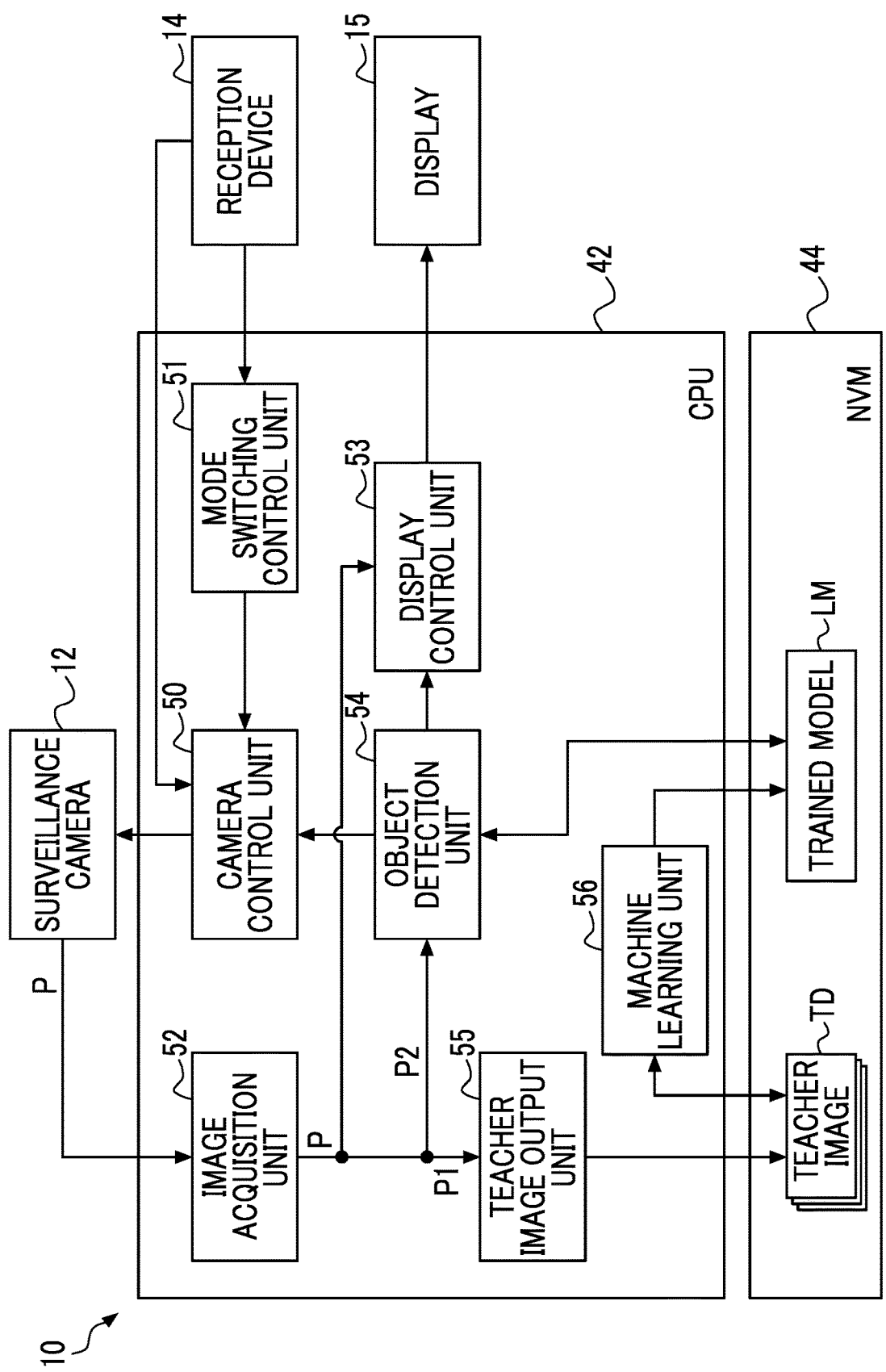
FIG. 3 is a block diagram showing an example of a function of a CPU provided in the management apparatus.

As shown in FIG. 3 as an example, a plurality of functional units are realized by the CPU 42 executing the operation based on the program PG. The program PG causes the CPU 42 to function as a camera control unit 50, a mode switching control unit 51, an image acquisition unit 52, a display control unit 53, an object detection unit 54, a teacher image output unit 55, and a machine learning unit 56.

The camera control unit 50 controls the controller 34 of the surveillance camera 12 to cause the imaging apparatus 18 to perform an imaging operation and the zoom, and to cause the revolution apparatus 20 to perform the pan and the tilt. That is, the camera control unit 50 causes the surveillance camera 12 to perform the imaging operation and to change the imaging range 31.

The mode switching control unit 51 performs switching control of switching the surveillance mode by the surveillance system 10 between the automatic surveillance mode and the manual surveillance mode based on the instruction received by the reception device 14. In a case of the manual surveillance mode, the mode switching control unit 51 causes the camera control unit 50 to perform the manual PTZ of changing the imaging range 31 according to the instruction given to the reception device 14. In a case of the automatic surveillance mode, the mode switching control unit 51 performs the automatic PTZ of changing the imaging range 31 according to the result of the object detection by the object detection unit 54.

The image acquisition unit 52 acquires a captured image P output from the surveillance camera 12 by causing the surveillance camera 12 to perform imaging by the camera control unit 50. The image acquisition unit 52 supplies the captured image P acquired from the surveillance camera 12 to the display control unit 53. The display control unit 53 displays the captured image P supplied from the image acquisition unit 52 on the display 15.

In a case of the manual surveillance mode, the image acquisition unit 52 supplies the captured image P acquired from the surveillance camera 12 to the teacher image output unit 55 as a first captured image P1. On the other hand, in a case of the automatic surveillance mode, the image acquisition unit 52 supplies the captured image P acquired from the surveillance camera 12 to the object detection unit 54 as a second captured image P2.

The object detection unit 54 detects the specific object (for example, the heavy machine) that appears in the second captured image P2 by using the trained model LM stored in the NVM 44. The object detection unit 54 supplies the detection result of the object detection to the display control unit 53 and the camera control unit 50. The display control unit 53 displays the detected object on the display 15 in a distinguishable manner based on the detection result supplied from the object detection unit 54. The camera control unit 50 changes the imaging range 31 based on the detection result supplied from the object detection unit 54 such that the detected object is positioned at the center of the imaging range 31 and the detected object is enlarged.

The teacher image output unit 55 stores the first captured image P1 as the teacher image TD in the NVM 44 according to the manual operation performed by the user on the surveillance camera 12 by using the reception device 14. In the present embodiment, the teacher image output unit 55 stores the first captured image P1 acquired in the manual surveillance mode after switching as the teacher image TD in the NVM 44 according to the fact that the user performs the switching operation of switching from the automatic surveillance mode to the manual surveillance mode by using the reception device 14. The switching operation is an operation of changing at least one of the pan, the tilt, or the zoom.

The machine learning unit 56 updates the trained model LM by additionally training the trained model LM by using the teacher image TD stored in the NVM 44. For example, in a case in which a certain number of the teacher images TD are accumulated in the NVM 44, the machine learning unit 56 additionally trains the trained model LM by using the plurality of accumulated teacher images TD. In a case in which the trained model LM is updated, the object detection unit 54 performs the object detection by using the updated trained model LM.

The trained model LM is configured by using a neural network. The trained model LM is configured by using, for example, a deep neural network (DNN), which is a multi-layer neural network that is a target of deep learning (DL). As the DNN, for example, a convolutional neural network (CNN) that uses an image as a target is used.

FIG. 4 shows an example of the manual PTZ in the manual surveillance mode. In the example shown in FIG. 4, two heavy machines H1 and H2 are shown as the objects in the captured image P displayed on the display 15. The user can change the imaging range 31 to a region of interest by the user by operating the keyboard, the mouse, or the like as the reception device 14. FIG. 4 shows a state in which the heavy machine H2 in which a person is present in the vicinity is interested as a surveillance target and the operation of changing the imaging range 31 is performed such that the region of interest including the heavy machine H2 matches the imaging range 31.

Figure 5:
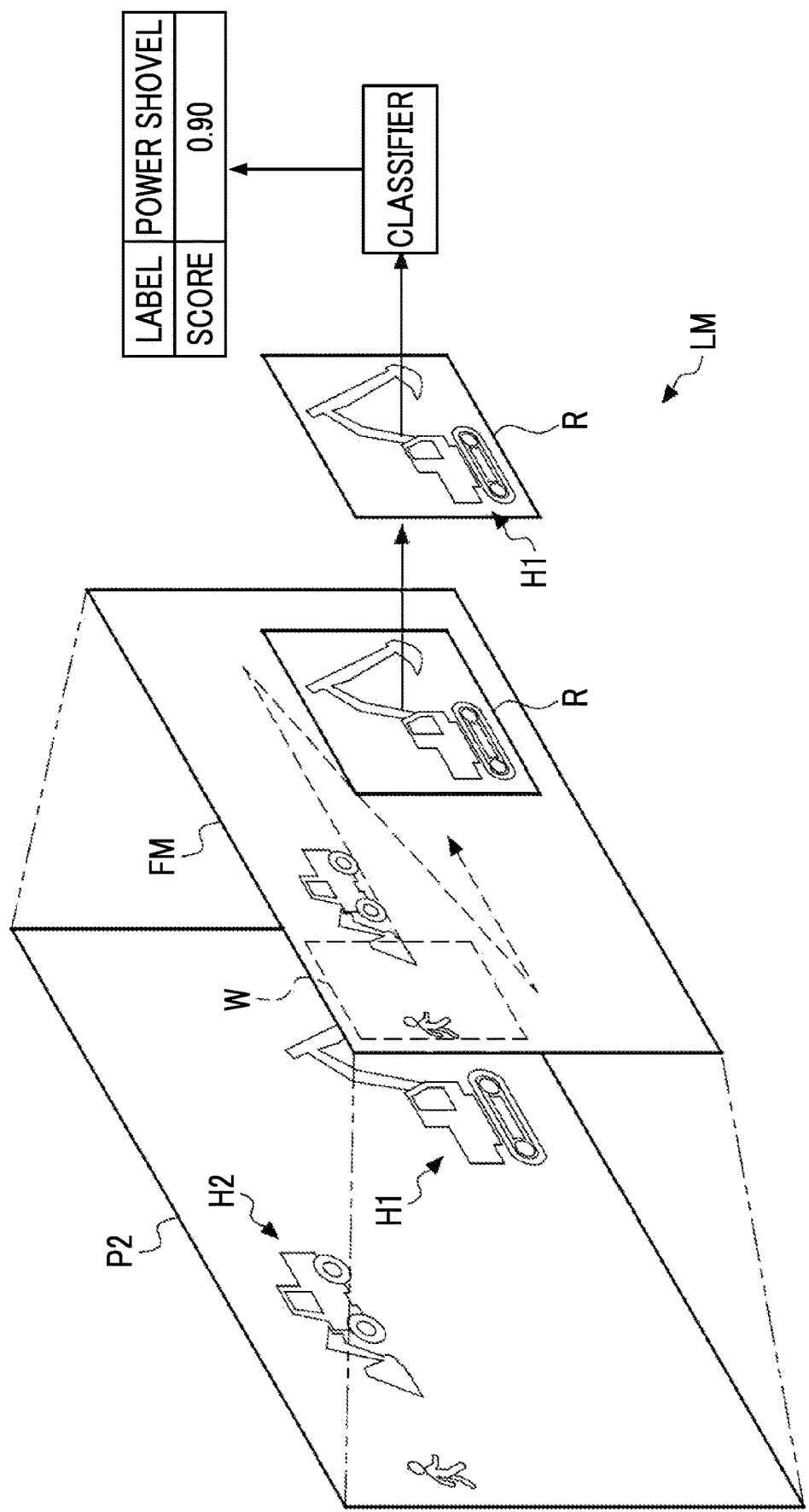
FIG. 5 is a conceptual diagram showing an example of an object detection process.

FIG. 5 shows an example of an object detection process by the object detection unit 54 using the trained model LM. In the present embodiment, the trained model LM is configured by using the CNN. The object detection unit 54 inputs the second captured image P2 as the input image to the trained model LM. The trained model LM generates a feature map FM representing a feature amount of the second captured image P2 by the convolutional layer.

The object detection unit 54 slides windows W of various sizes with respect to the feature map FM, and determines whether or not an object candidate is present in the window W. In a case of determining that the object candidate is present in the window W, the object detection unit 54 cuts out an image R in the window W including the object candidate from the feature map FM, and inputs the cutout image R to a classifier. The classifier outputs a label and a score of the object candidate included in the image R. The label represents a type of the object. The score represents a probability that the object candidate is the type of the object represented by the label. In the example shown in FIG. 5, the heavy machine H1 is extracted as the object candidate, and it is determined by the classifier that the label of the heavy machine H1 is "power shovel". In addition, the score representing the probability that the heavy machine H1 is "power shovel" is "0.90".

The object detection unit 54 outputs positional information of the image R including the object having the score equal to or greater than a certain value, the label, and the score as the detection result. It should be noted that, in the example shown in FIG. 5, one object is detected from the second captured image P2, but two or more objects may also be detected.

As shown in FIG. 6 as an example, the display control unit 53 displays a rectangular frame F in the captured image P to surround the object detected by the object detection unit 54. In addition, the display control unit 53 displays a label L representing the type of the object in the frame F in the vicinity of the frame F. It should be noted that the display control unit 53 may further display the score. In addition, in a case in which two or more objects are detected, the display control unit 53 displays a plurality of frames F in the captured image P.

FIG. 6 shows an example of the automatic PTZ in the automatic surveillance mode. In the example shown in FIG. 6, the two heavy machines H1 and H2 appear as the objects in the captured image P displayed on the display 15, the heavy machine H1 is detected by the object detection unit 54, and the heavy machine H2 is not detected as the object. In such a case, the camera control unit 50 performs control of changing the imaging range 31 such that the region including the heavy machine H1 matches the imaging range 31. As a result, the automatic PTZ is performed to track the heavy machine H1.

It should be noted that, in a case in which two or more objects detected by the object detection unit 54 are present in the captured image P, for example, the camera control unit 50 performs control of changing the imaging range 31 such that the region including the object having the highest score matches the imaging range 31.

FIG. 7 shows an example in which the object is erroneously detected by the object detection unit 54 in the automatic surveillance mode. In the example shown in FIG. 7, a vehicle that is not the heavy machine is erroneously detected as the power shovel, and the automatic PTZ is performed to track the vehicle. However, in such a case in which the object that is not the surveillance target is erroneously detected, there is a possibility that the surveillance target is present in another region. For example, in the example shown in FIG. 7, the user takes an interest in the heavy machine H2 in which a person is present in the vicinity as the surveillance target. In such a case, the user operates the reception device 14 to perform the manual PTZ such that the region of interest including the heavy machine H2 matches the imaging range 31. In this way, in a case in which the object is not the surveillance target intended by the user after the object is detected in the automatic surveillance mode, the user may operate the reception device 14 to perform the manual PTZ.

Figure 8:
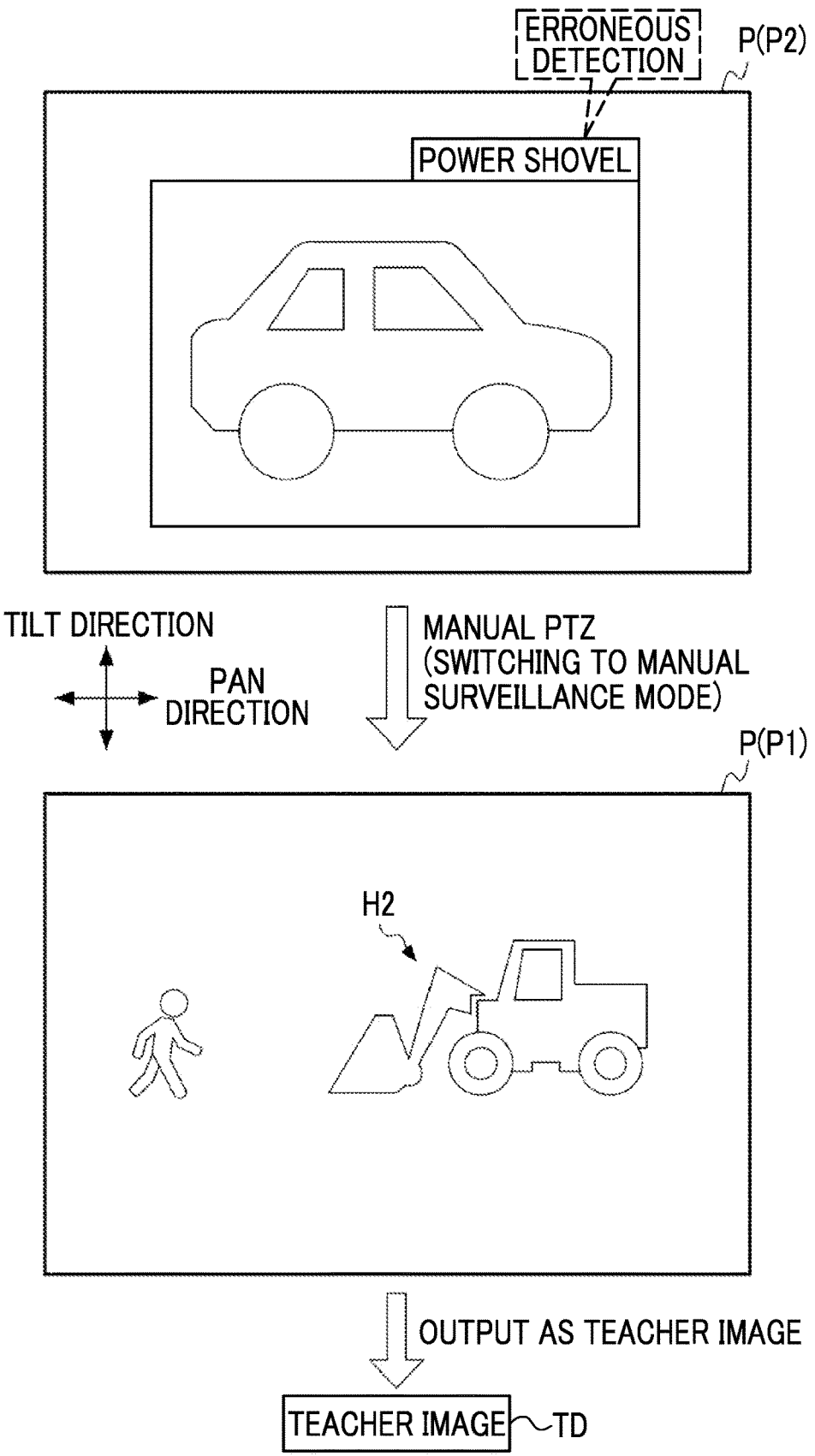
FIG. 8 is a conceptual diagram showing an example in which the manual PTZ is performed in the automatic surveillance mode.

FIG. 8 shows an example in which the manual PTZ is performed in the automatic surveillance mode. In the example shown in FIG. 8, according to the fact that the automatic PTZ is performed with respect to the vehicle that is erroneously detected by the object detection unit 54, the user performs the manual PTZ such that the region of interest (see FIG. 7) intended by the user matches the imaging range 31. In the automatic surveillance mode, in a case in which the user operates the reception device 14 to perform the manual PTZ, the mode switching control unit 51 switches the surveillance mode from the automatic surveillance mode to the manual surveillance mode.

According to the fact that the surveillance mode is switched from the automatic surveillance mode to the manual surveillance mode, the teacher image output unit 55 outputs the first captured image P1 after switching to the manual surveillance mode as the teacher image TD. For example, the teacher image output unit 55 outputs, as the teacher image TD, the first captured image P1 at a point in time at which the surveillance mode is switched to the manual surveillance mode by the user performing the manual PTZ and the manual PTZ is stopped.

Figure 9:
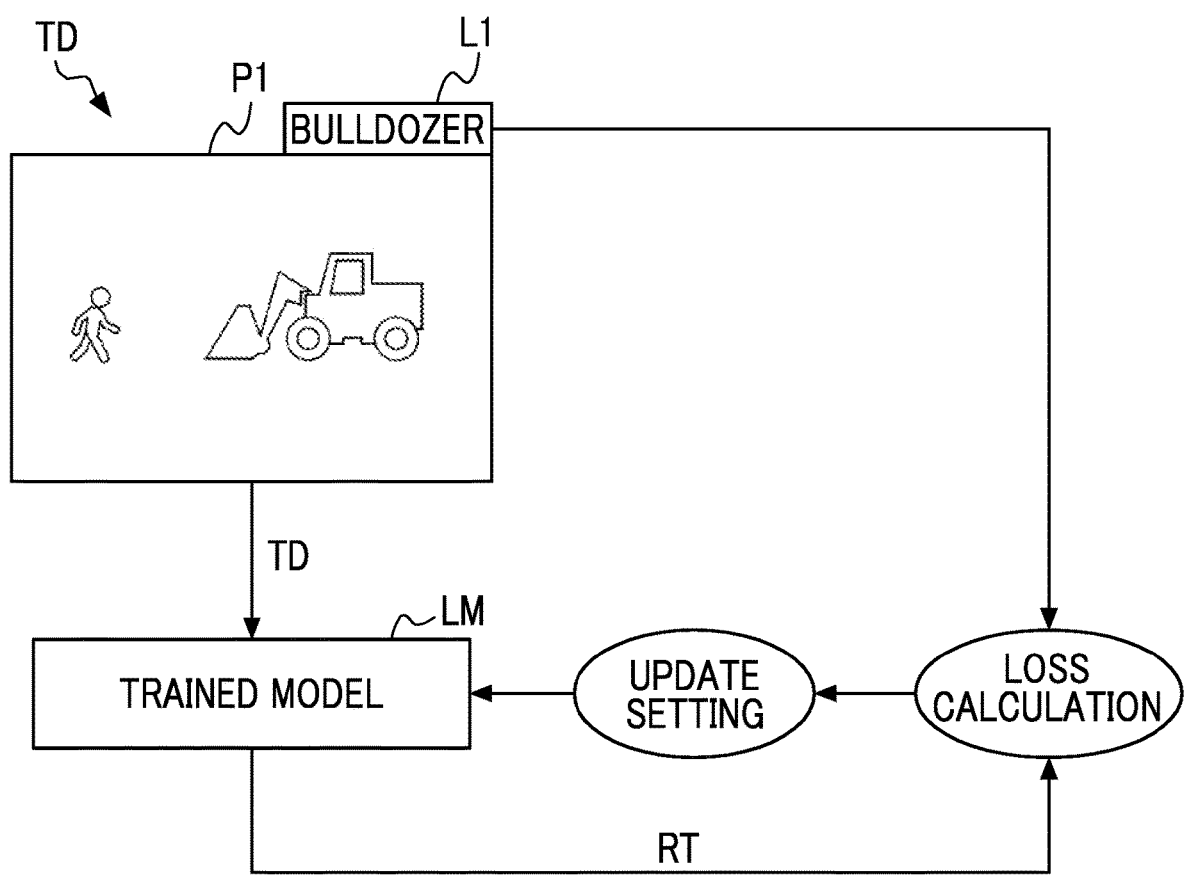
FIG. 9 is a conceptual diagram showing an example of a learning process.

FIG. 9 shows an example of a learning process in which the trained model LM is additionally trained by using the teacher image TD. In the learning process, the teacher image TD is input to the trained model LM. A correct answer label L1 representing the type of the object included in the first captured image P1 is added to the teacher image TD. Since the object that appears in the first captured image P1 is the object that is not detected by the object detection unit 54, the correct answer label L1 is added, for example, by the user discriminating the type of the object.

The trained model LM outputs a detection result RT based on the input teacher image TD. The detection result RT is the label L and the score described above. A loss calculation using a loss function is performed based on the detection result RT and the correct answer label L1. Then, update settings of various coefficients (weighting coefficient, bias, and the like) of the trained model LM are performed according to a result of the loss calculation, and the trained model LM is updated according to the update settings.

It should be noted that the label L may simply be a label representing whether or not the detected object is the correct answer (for example, whether or not the detected object is the heavy machine). In such a case, for example, the label L is represented by a binary value of "1" or "0", the correct answer label L1 is set to "1", and an incorrect answer label L0 is set to "0". It should be noted that the correct answer label L1 is an example of a "determination result that is suitable for detection of the object" according to the technology of the present disclosure. The incorrect answer label L0 is an example of a "determination result that is not suitable for detection of an object" according to the technology of the present disclosure.

As described above, since there is a high possibility that the object that is the surveillance target set by the user by the manual PTZ is the correct answer, the first captured image P1 to which the correct answer label L1 is added is output as the teacher image TD. In this manner, by additionally training the trained model LM by using the teacher image TD, the accuracy of the object detection is improved. In addition, it is possible to detect a new type of the object. For example, in a case in which the bulldozer, which is a type of the heavy machine, cannot be detected in the automatic surveillance mode, the user additionally learns the teacher image TD including the bulldozer which is the surveillance target by the manual surveillance mode, so that it is possible to newly detect the bulldozer as the heavy machine.

Hereinafter, an action of the surveillance system 10 will be described with reference to FIG. 10.

Figure 10:
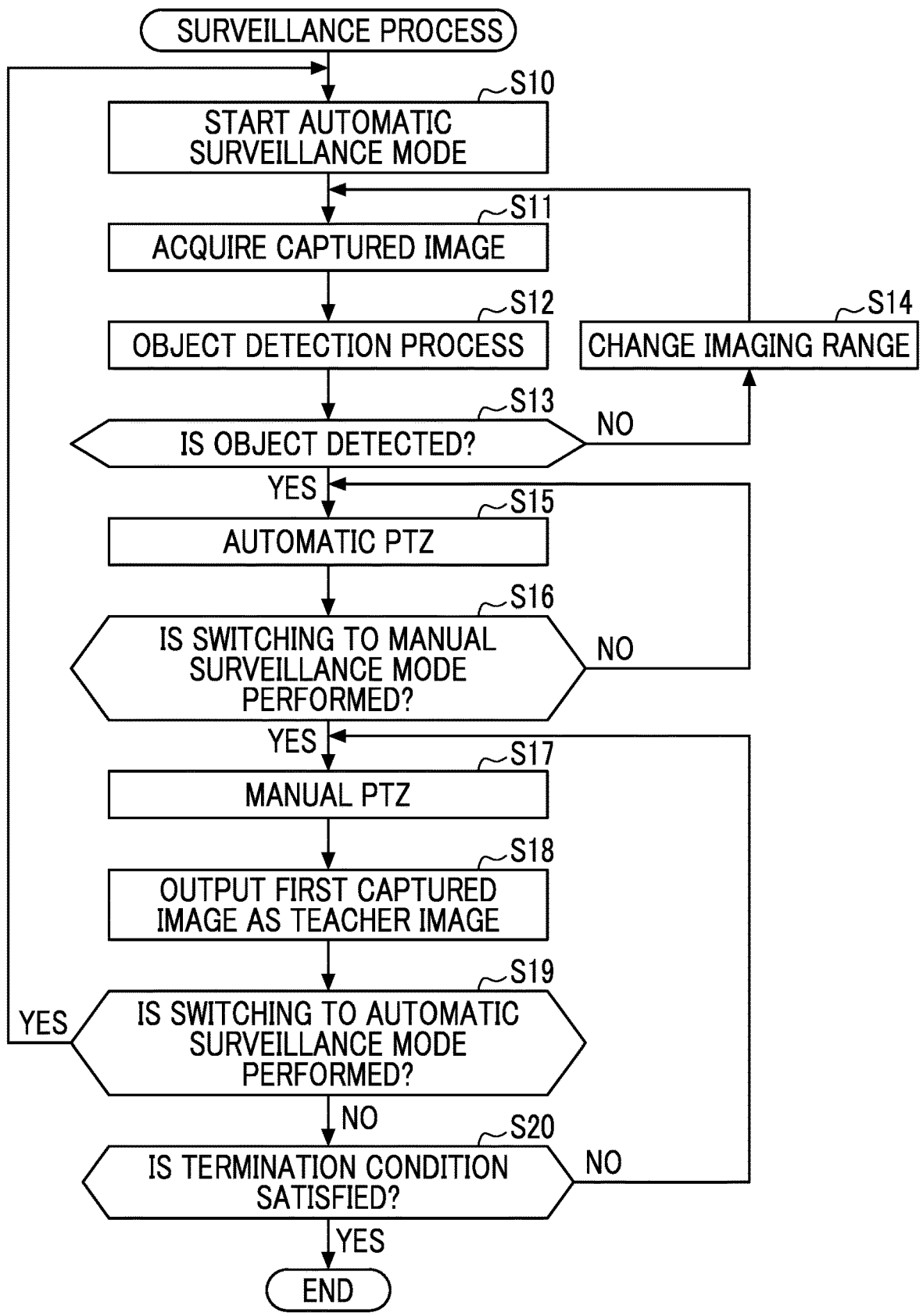
FIG. 10 is a flowchart showing an example of a flow of a surveillance process according to the first embodiment.

FIG. 10 shows a flowchart showing an example of a flow of a surveillance process executed by the CPU 42. It should be noted that the flow of the surveillance process shown in FIG. 10 is an example of a "control method" according to the technology of the present disclosure. In addition, here, for convenience of description, the description will be made on the premise that the imaging by the imaging apparatus 18 is performed at a predetermined frame rate.

In the surveillance process shown in FIG. 10, first, in step S10, the mode switching control unit 51 causes the camera control unit 50 to start the operation in the automatic surveillance mode. In a case in which the automatic surveillance mode is started, the surveillance camera 12 performs the imaging operation by using the imaging range 31 (see FIG. 1) set in the surveillance region 30 as a target. After step S10, the surveillance process proceeds to step S11.

In step S11, the image acquisition unit 52 acquires the captured image P output from the surveillance camera 12, and supplies the captured image P to the object detection unit 54 as the second captured image P2. In this case, the captured image P is displayed on the display 15 via the display control unit 53. After step S11, the surveillance process proceeds to step S12.

In step S12, the object detection unit 54 performs the object detection process of detecting the specific object (for example, the heavy machine) that appears in the second captured image P2 by using the trained model LM (see FIG. 5). After step S12, the surveillance process proceeds to step S13.

In step S13, the camera control unit 50 determines whether or not the object is detected by the object detection unit 54. In a case in which the object is not detected in step S13, a negative determination is made, and the surveillance process proceeds to step S14. In a case in which the object is detected in step S13, a positive determination is made, and the surveillance process proceeds to step S15.

In step S14, the camera control unit 50 causes the surveillance camera 12 to perform the pan or the tilt to change the imaging range 31 in the pan direction or the tilt direction (see FIG. 1). After step S14, the surveillance process returns to step S11. In step S11, the image acquisition unit 52 performs the captured image acquisition process again.

In step S15, the camera control unit 50 performs the automatic PTZ of changing the imaging range 31 according to the detection result of the object detected by the object detection unit 54 (see FIGS. 6 and 7). After step S15, the surveillance process proceeds to step S16.

In step S16, the mode switching control unit 51 determines whether or not the surveillance mode is switched from the automatic surveillance mode to the manual surveillance mode by the user operating the reception device 14 to perform the manual PTZ. In step S16, in a case in which the surveillance mode is not switched to the manual surveillance mode, a negative determination is made, and the surveillance process returns to step S15. In step S16, in a case in which the surveillance mode is switched to the manual surveillance mode (see FIG. 8), a positive determination is made, and the surveillance process proceeds to step S17. For example, in a case in which the user operates the reception device 14 to execute the manual PTZ in the automatic surveillance mode, a positive determination is made.

In step S17, the camera control unit 50 performs the manual PTZ of changing the imaging range 31 according to the instruction given to the reception device 14 by the user (see FIG. 4). After step S17, the surveillance process proceeds to step S18.

In step S18, the teacher image output unit 55 outputs the first captured image P1 acquired in the manual surveillance mode as the teacher image TD (see FIG. 8). After step S18, the surveillance process proceeds to step S19.

In step S19, the mode switching control unit 51 determines whether or not the surveillance mode is switched from the manual surveillance mode to the automatic surveillance mode by operating the reception device 14 by the user. In step S19, in a case in which the surveillance mode is not switched to the automatic surveillance mode, a negative determination is made, and the surveillance process proceeds to step S20. In step S19, in a case in which the surveillance mode is switched to the automatic surveillance mode, the surveillance process returns to step S10.

In step S20, the mode switching control unit 51 determines whether or not a condition for terminating the surveillance process (hereinafter, referred to as "termination condition") is satisfied. Examples of the termination condition is a condition that the reception device 14 receives an instruction to terminate the surveillance process. In step S20, in a case in which the termination condition is not satisfied, a negative determination is made, and the surveillance process returns to step S17. In step S20, in a case in which the termination condition is satisfied, a positive determination is made, and the surveillance process is terminated.

As described above, the management apparatus 16 as the control apparatus enables switching between the manual surveillance mode in which the surveillance camera 12 is caused to perform the imaging to acquire the first captured image P1 and the imaging range 31 is changed according to the given instruction, and the automatic surveillance mode in which the surveillance camera 12 is caused to perform the imaging to acquire the second captured image P2, the trained model LM that has been trained through the machine learning is used to detect the object that appears in the second captured image P2, and the imaging range 31 is changed according to the detection result. Then, the management apparatus 16 outputs the first captured image P1 acquired in the manual surveillance mode as the teacher image TD for the machine learning. As described above, according to the technology of the present disclosure, it is possible to efficiently collect the teacher image TD used for the machine learning without performing a special operation by the user.

In addition, the management apparatus 16 outputs the first captured image P1 as the teacher image TD according to the manual operation performed with respect to the surveillance camera 12. This manual operation is the switching operation from the automatic surveillance mode to the manual surveillance mode, and the management apparatus 16 outputs the first captured image acquired in the manual surveillance mode after switching from the automatic surveillance mode to the manual surveillance mode as the teacher image TD. In addition, the surveillance camera 12 can change the imaging range 31 by changing at least one of the pan, the tilt, or the zoom, and the switching operation is the operation of changing at least one of the pan, the tilt, or the zoom in the automatic surveillance mode. As described above, according to the technology of the present disclosure, it is possible to efficiently collect the teacher image TD according to the intention of the user.

Second Embodiment

In the first embodiment, the example is described in which the first captured image is output as the teacher image TD according to the fact that the switching operation of the surveillance mode from the automatic surveillance mode to the manual surveillance mode is performed. However, in a second embodiment, the first captured image is output as the teacher image TD according to an output instruction given by the user.

Figure 11:
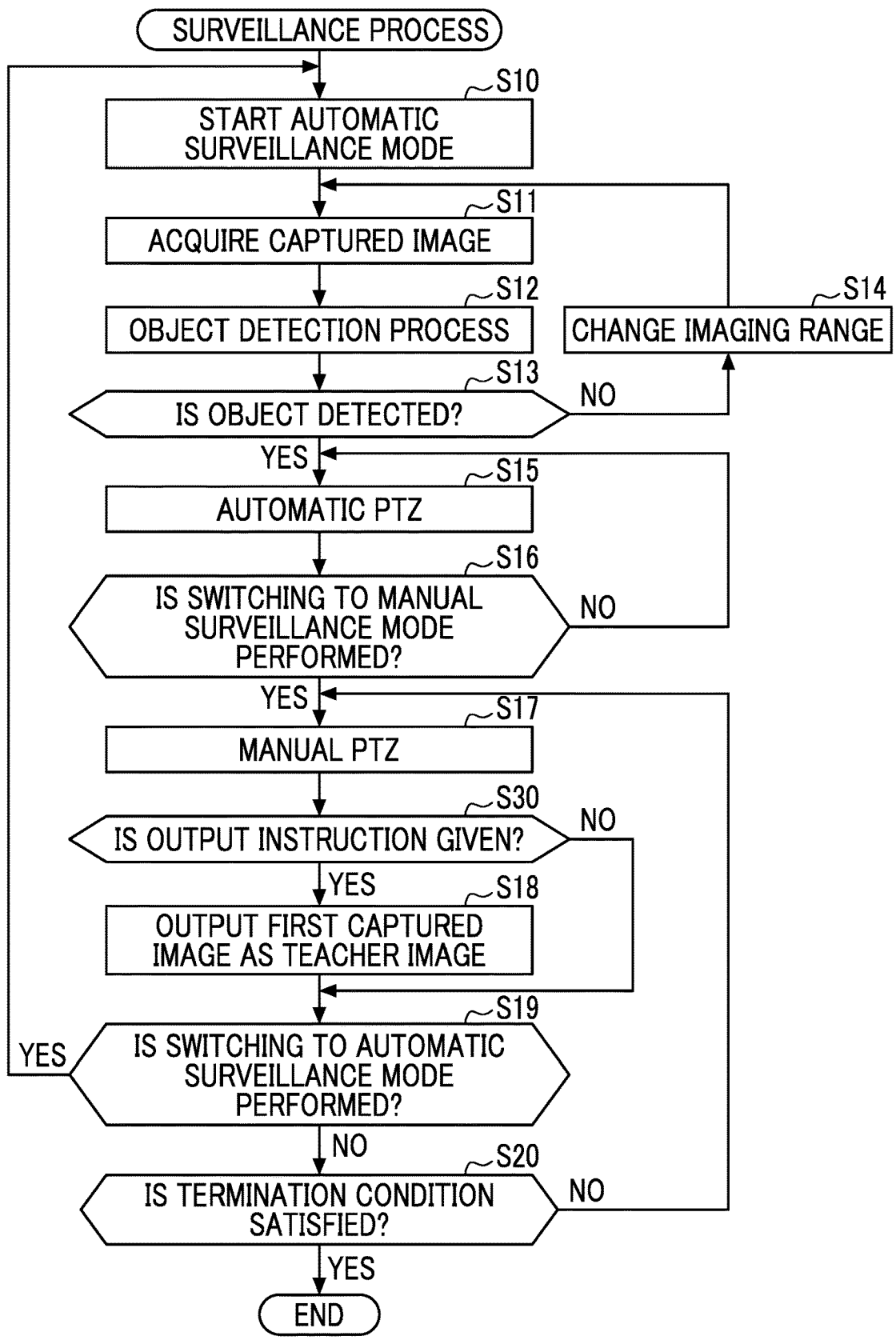
FIG. 11 is a flowchart showing an example of a flow of a surveillance process according to a second embodiment.

FIG. 11 shows an action of the surveillance system 10 according to the second embodiment. As shown in FIG. 11, in the present embodiment, step S30 is added between step S17 and step S18. Other steps are the same as in the first embodiment.

In the present embodiment, after the manual PTZ is started in step S17, the surveillance process proceeds to step S30.

In step S30, it is determined whether or not the user gives the output instruction by operating the reception device 14. For example, the user operates the mouse as the reception device 14, and clicks a dedicated button displayed on the display 15 to give the output instruction. In a case in which the output instruction is given in step S30, a positive determination is made, and the surveillance process proceeds to step S18. In a case in which the output instruction is not given in step S30, a negative determination is made, and the surveillance process proceeds to step S19.

In step S18, similar to the first embodiment, the teacher image output unit 55 performs the teacher image output process of outputting the first captured image P1 acquired in the manual surveillance mode as the teacher image TD.

As described above, in the present embodiment, the management apparatus 16 outputs the first captured image P1 as the teacher image TD according to the given output instruction after switching from the automatic surveillance mode to the manual surveillance mode, so that it is possible to efficiently collect the teacher image TD according to the intention of the user.

Third Embodiment

In the first embodiment, the example is described in which the first captured image is output as the teacher image TD according to the fact that the switching operation of the surveillance mode from the automatic surveillance mode to the manual surveillance mode is performed. However, in a third embodiment, the second captured image P2 acquired in the automatic surveillance mode before switching is output as the teacher image TD in addition to the first captured image.

Figure 12:
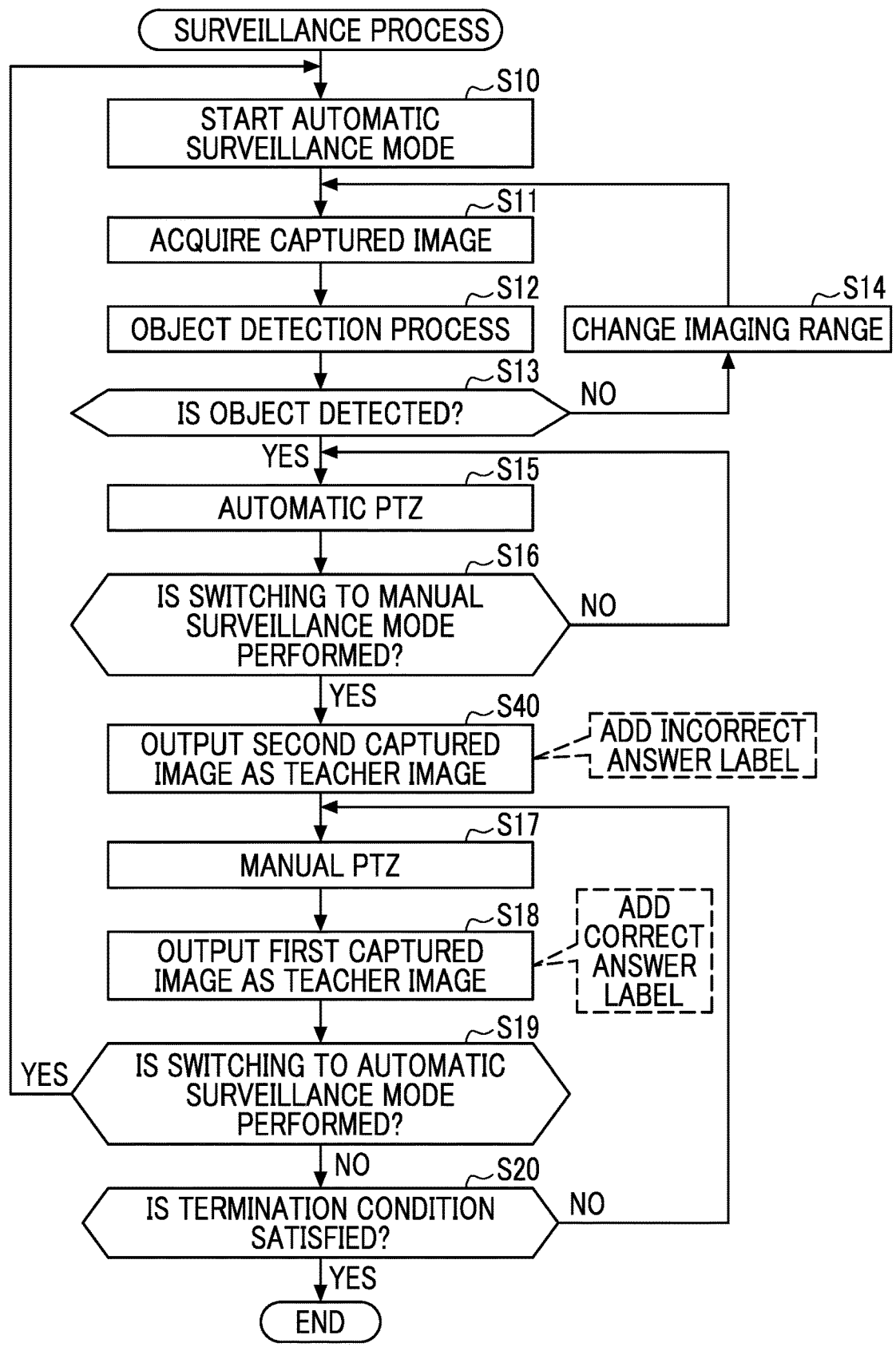
FIG. 12 is a flowchart showing an example of a flow of a surveillance process according to a third embodiment.

FIG. 12 shows an action of the surveillance system 10 according to the third embodiment. As shown in FIG. 12, in the present embodiment, step S40 is added between step S16 and step S17. Other steps are the same as in the first embodiment.

In the present embodiment, in step S16, in a case in which the surveillance mode is switched to the manual surveillance mode, a positive determination is made, and the surveillance process proceeds to step S40.

In step S40, the teacher image output unit 55 outputs the second captured image P2 (see FIG. 8) acquired in the automatic surveillance mode before switching as the teacher image TD. In a case in which the user performs the switching operation from the automatic surveillance mode to the manual surveillance mode, it is considered that the object detection by the object detection unit 54 is the erroneous detection as shown in FIG. 8 in the second captured image P2 acquired in the automatic surveillance mode before switching, so that the teacher image output unit 55 outputs the second captured image P2 as the teacher image TD to which the incorrect answer label L0 is added. After step S40, the surveillance process proceeds to step S17.

It should be noted that, in the present embodiment, in step S18, the teacher image output unit 55 outputs the first captured image P1 acquired in the manual surveillance mode as the teacher image TD to which the correct answer label L1 is added.

As described above, in the present embodiment, the management apparatus 16 outputs the second captured image P2 acquired in the automatic surveillance mode before switching as the teacher image TD to which the incorrect answer label L0 is added, and outputs the first captured image P1 acquired in the manual surveillance mode after switching as the teacher image TD to which the correct answer label L1 is added. As a result, in the present embodiment, the correct answer label L1 or the incorrect answer label L0 can be automatically assigned to the teacher image TD, and the time and effort of the user can be reduced. In addition, by additionally training the trained model LM by using the second captured image P2 in addition to the first captured image P1, the detection accuracy of the object detection is improved.

Fourth Embodiment

Hereinafter, a fourth embodiment will be described. The fourth embodiment is a modification of the third embodiment. In the third embodiment, in a case in which the surveillance mode is switched from the automatic surveillance mode to the manual surveillance mode, the second captured image P2 acquired in the automatic surveillance mode before switching is output as the teacher image TD. In the fourth embodiment, in a case in which a certain condition is satisfied after the surveillance mode is switched from the automatic surveillance mode to the manual surveillance mode, the second captured image P2 acquired in the automatic surveillance mode before switching is output as the teacher image TD.

Figure 13:
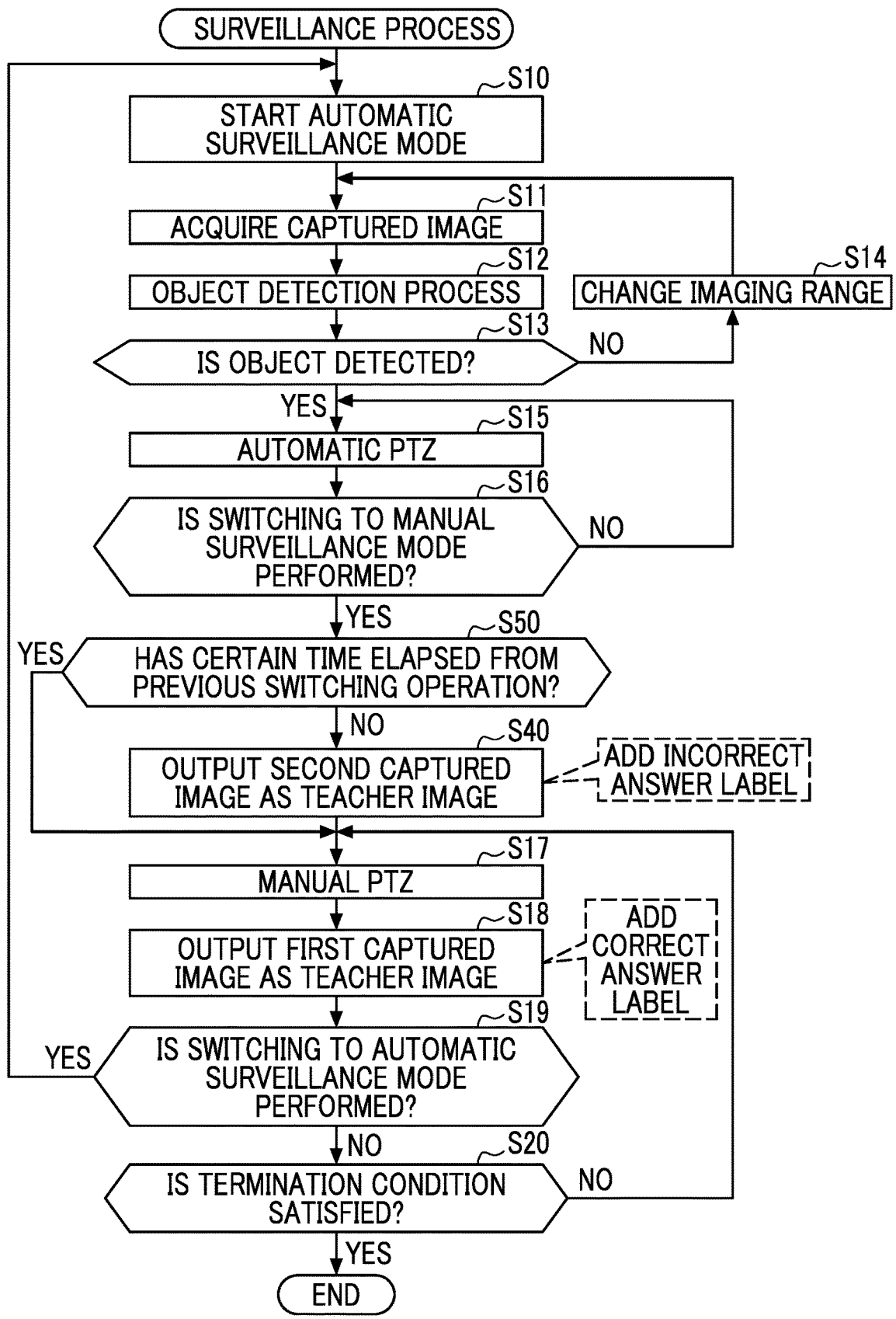
FIG. 13 is a flowchart showing an example of a flow of a surveillance process according to a fourth embodiment.

FIG. 13 shows an action of the surveillance system 10 according to the fourth embodiment. In the present embodiment, in step S19, the mode switching control unit 51 determines whether or not the operation is not performed for a certain time in the manual surveillance mode (that is, a non-operation state continues for a certain time) after switching from the automatic surveillance mode to the manual surveillance mode. In a case in which the operation is not performed for the certain time in step S19, a positive determination is made, and the surveillance process returns to step S10. In step S19, in a case in which the operation is performed before the elapse of the certain time, a negative determination is made, and the surveillance process proceeds to step S20. That is, in the present embodiment, after switching from the automatic surveillance mode to the manual surveillance mode, in a case in which the operation is not performed for the certain time in the manual surveillance mode, the surveillance mode proceeds to the automatic surveillance mode.

In addition, in the present embodiment, step S50 is added between step S16 and step S40. Other steps are the same as in the third embodiment.

In the present embodiment, in step S16, in a case in which the surveillance mode is switched to the manual surveillance mode, a positive determination is made, and the surveillance process proceeds to step S50.

In step S50, the mode switching control unit 51 determines whether or not the current switching operation is performed after the elapse of the certain time from the previous switching operation. Specifically, the mode switching control unit 51 counts timing from the point in time at which the surveillance mode is switched to the manual surveillance mode by a positive determination made in step S16, and determines whether or not the elapsed time until the surveillance mode is switched to the automatic surveillance mode by a positive determination made in step S19 and a positive determination is made in step S16 again is within the certain time.

In step S50, in a case in which the current switching operation is not performed after the elapse of the certain time from the previous switching operation, a negative determination is made, and the surveillance process proceeds to step S40. In step S50, in a case in which the current switching operation is performed after the elapse of the certain time from the previous switching operation, a positive determination is made, and the surveillance process proceeds to step S17.

As described above, in the present embodiment, in a case in which the certain time has elapsed from the previous switching operation, the teacher image output unit 55 does not output the second captured image P2 acquired in the automatic surveillance mode before switching as the teacher image TD. This case corresponds to, for example, a situation in which the surveillance mode is switched to the automatic surveillance mode due to the continuation of the non-operation state by the user moving away from the location of the management apparatus 16 after the user switches the surveillance mode to the manual surveillance mode, and the surveillance mode is switched to the manual surveillance mode by the user returning to the location of the management apparatus 16 again. The reason is that, in such a situation, there is a high possibility that the user does not observe the second captured image P2 acquired in the automatic surveillance mode immediately before switching to the manual surveillance mode, and it is not considered that the user switches the surveillance mode to the manual surveillance mode by determining that the object detection is the erroneous detection. That is, the reason is that it is considered that the user performs the switching operation simply to return the surveillance mode to the manual surveillance mode after switching from the manual surveillance mode to the automatic surveillance mode due to the continuation of the non-operation state.

As described above, in the present embodiment, it is possible to prevent the second captured image P2 from being output as the teacher image TD under the situation not intended by the user.

Hereinafter, FIGS. 14 to 17 show various modification examples of the teacher image output process by the teacher image output unit 55.

First Modification Example

Figure 14:
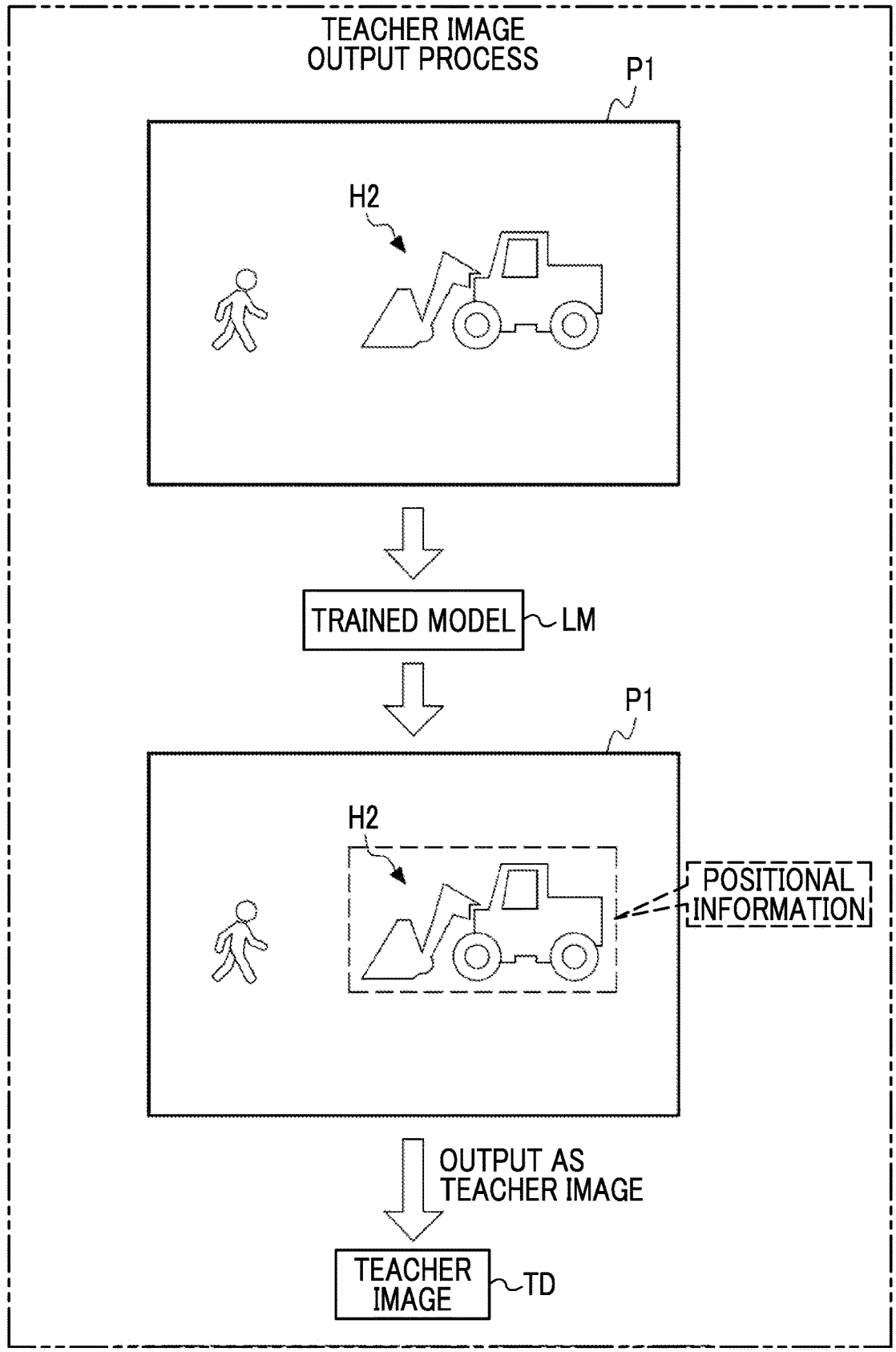
FIG. 14 is a conceptual diagram showing a first modification example of a teacher image output process.

FIG. 14 shows a first modification example of the teacher image output process. As shown in FIG. 14, in the first modification example, the teacher image output unit 55 detects the object that appears in the teacher image TD, and adds the positional information of the detected object in the teacher image TD into the teacher image TD.

For example, the teacher image output unit 55 detects the object from the first captured image P1 that is an output target as the teacher image TD by using the trained model LM, and adds the positional information of the detected object to the first captured image P1. Then, the teacher image output unit 55 outputs the first captured image P1 to which the positional information is added as the teacher image TD.

It should be noted that, in a case in which the second captured image P2 is the output target, the teacher image output unit 55 may perform the same positional information addition process on the second captured image P2.

In addition, it is preferable that a detection standard for the object detection in a case in which the teacher image output unit 55 detects the object by using the trained model LM is lower than a detection standard for the object detection in a case in which the object detection unit 54 detects the object by using the trained model LM. For example, the detection standard is a lower limit value of the score for determining that the object candidate is the specific object. For example, in a case in which the object detection unit 54 detects the object by using the trained model LM, it is determined that the object is the heavy machine in a case in which the score is 0.9 or more, and in a case in which the teacher image output unit 55 detects the object is detected by using the trained model LM, it is determined that the object is the heavy machine in a case in which the score is 0.7 or more.

In this way, the detection standard for the object detection in a case of detecting the object that appears in the teacher image TD is made lower than the detection standard for the object detection in a case of detecting the object that appears in the second captured image P2 in the automatic surveillance mode, so that the detection accuracy of the trained model LM is improved, and an object that cannot be detected up to now can be detected.

Second Modification Example

Figure 15:
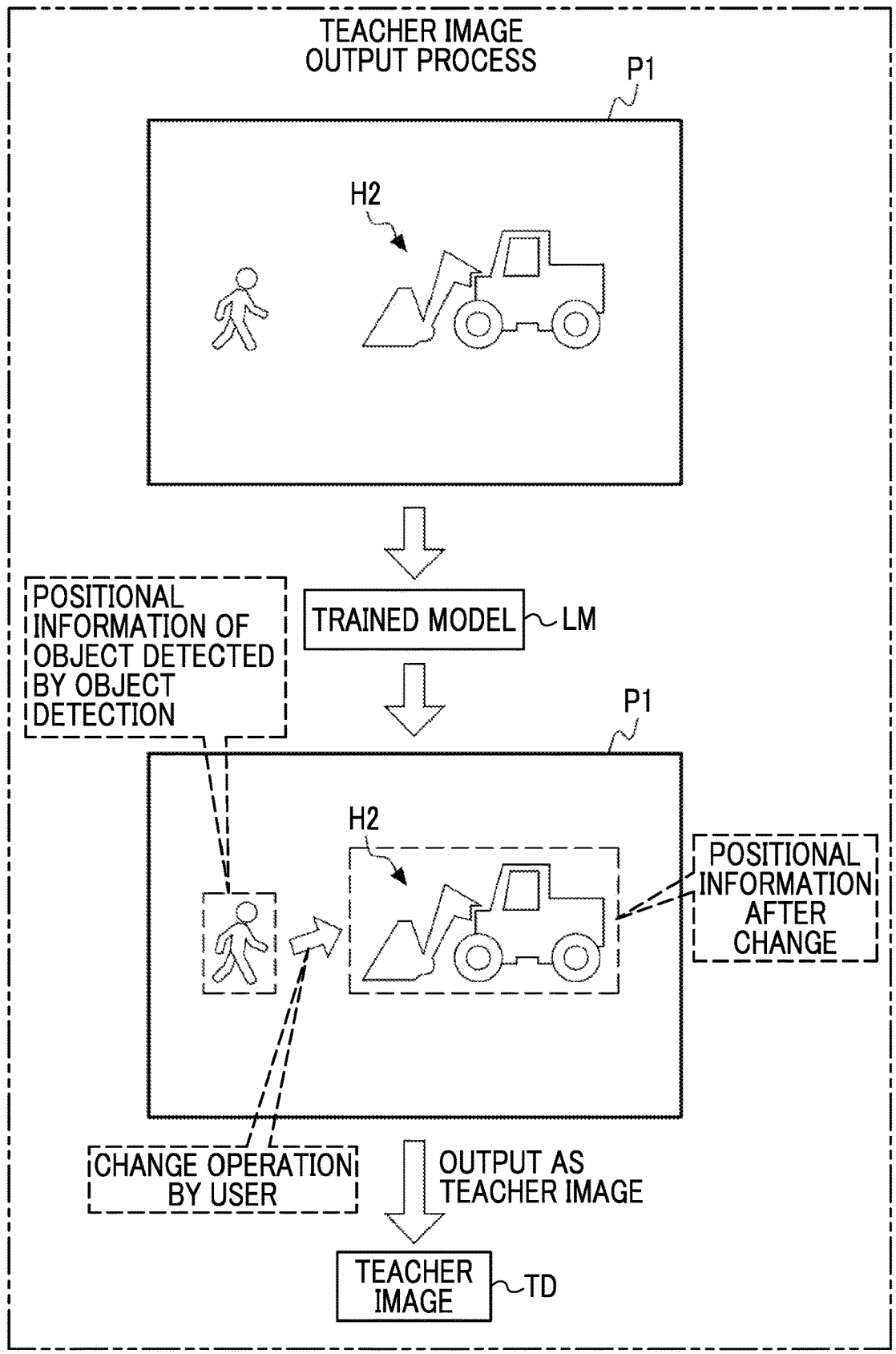
FIG. 15 is a conceptual diagram showing a second modification example of the teacher image output process.

FIG. 15 shows a second modification example of the teacher image output process. As shown in FIG. 15, in the second modification example, the user can change the positional information, in addition to the positional information addition process shown in the first modification example.

In the present embodiment, the teacher image output unit 55 detects the object from the first captured image P1 that is the output target as the teacher image TD by using the trained model LM, and displays the positional information of the detected object together with the first captured image P1 on the display 15 via the display control unit 53. The user can change and decide the positional information displayed on the display 15. For example, the user can change and decide a position, a shape, and a size of the rectangular frame representing the positional information of the object by using the reception device 14. In the example shown in FIG. 15, in a case in which a person who is not the heavy machine is detected as the object by the trained model LM, the user changes the positional information such that the positional information represents a region of the heavy machine H2.

The teacher image output unit 55 changes the positional information according to the instruction given to the reception device 14, and outputs the first captured image P1 to which the changed positional information is added as the teacher image TD.

It should be noted that, in a case in which the second captured image P2 is the output target, the teacher image output unit 55 may perform the same positional information change process on the second captured image P2.

As described above, according to the present modification example, since the user can change the positional information to an appropriate position, the accuracy of the additional training of the trained model LM is improved.

Third Modification Example

In a third modification example, the teacher image output unit 55 decides the position of the object that appears in the teacher image TD according to the instruction given by the user without performing the object detection by using the trained model LM, and adds the positional information of the decided object in the teacher image TD to the teacher image TD.

Figure 16:
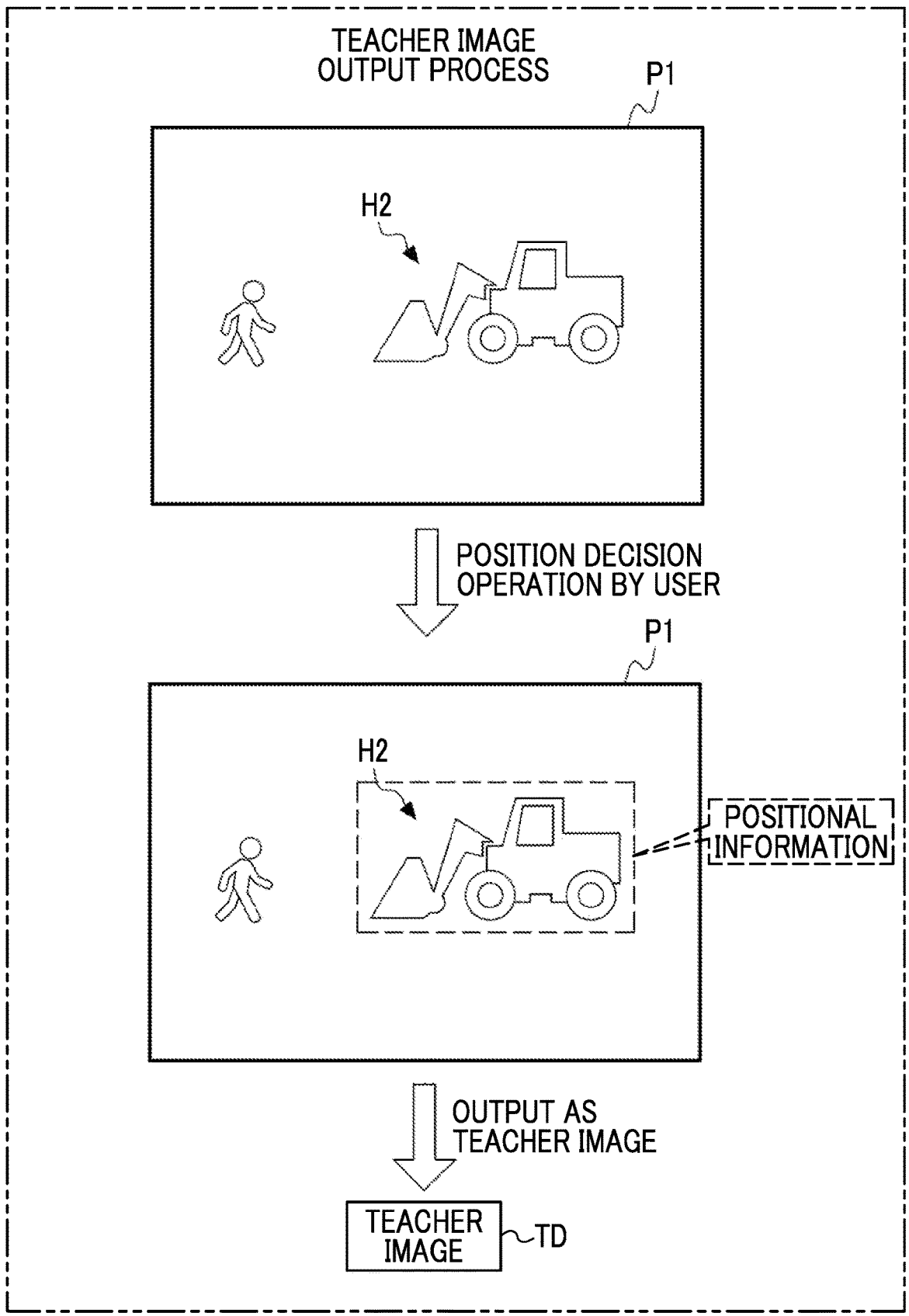
FIG. 16 is a conceptual diagram showing a third modification example of the teacher image output process.

As shown in FIG. 16 as an example, the teacher image output unit 55 displays the first captured image P1 that is the output target as the teacher image TD on the display 15 via the display control unit 53. The teacher image output unit 55 decides the position of the heavy machine H2 that appears in the first captured image P1 that is the output target as the teacher image TD according to the instruction given to the reception device 14, and outputs the first captured image P1 to which the positional information of the heavy machine H2 is added as the teacher image TD. For example, the user can decide the position of the object by changing and deciding the position, the shape, and the size of the rectangular frame representing the positional information of the object by using the reception device 14.

Similarly, in a case in which the second captured image P2 is the output target, the teacher image output unit 55 can add the positional information according to the instruction given by the user.

According to the present modification example, since the user can decide the position of the object that appears in the teacher image TD, the accuracy of the machine learning of the trained model LM is improved.

Fourth Modification Example

Figure 17:
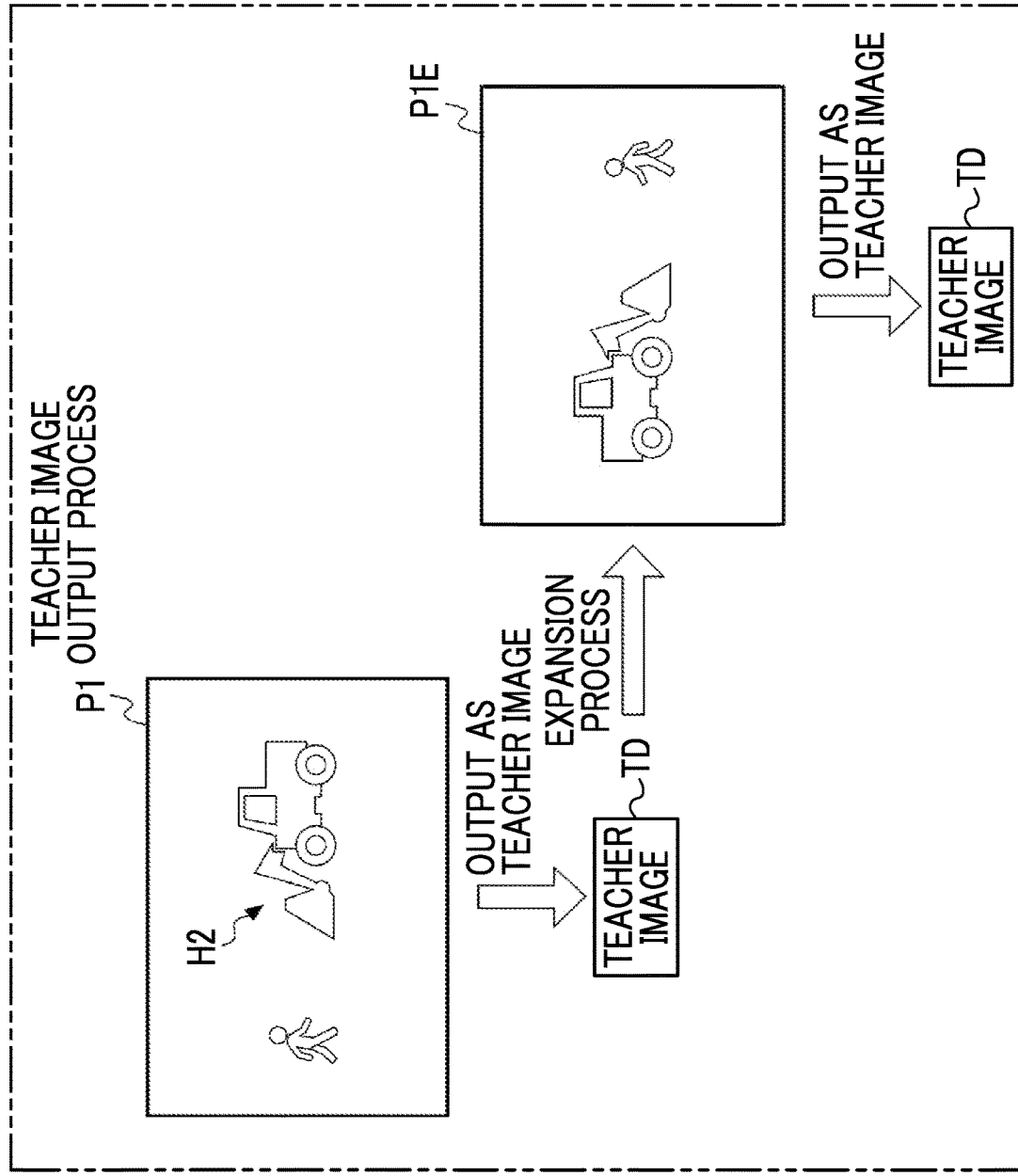
FIG. 17 is a conceptual diagram showing a fourth modification example of the teacher image output process.

In a fourth modification example, in order to further improve the accuracy of the machine learning of the trained model LM, the teacher image output unit 55 performs an expansion process of padding the teacher image TD by performing the expansion process. As shown in FIG. 17 as an example, the teacher image output unit 55 outputs, in addition to the first captured image P1 that is the output target as the teacher image TD, an expansion image P1E obtained by inverting the first captured image P1 as the teacher image TD. As a result, the number of the teacher images TD is increased, so that the accuracy of the machine learning of the trained model LM is improved.

It should be noted that the expansion process of generating the expansion image P1E is not limited to the inversion process. The expansion process need only be at least any one process of inversion, reduction, addition of noise, or style change using deep learning.

Similarly, in a case in which the second captured image P2 is the output target, the teacher image output unit 55 can increase the number of the teacher images TD by performing the expansion process.

It should be noted that the various processes described in the first to fourth modification examples may be performed after the teacher image TD output from the teacher image output unit 55 is stored in the storage device, such as the NVM 44.

Figure 18:
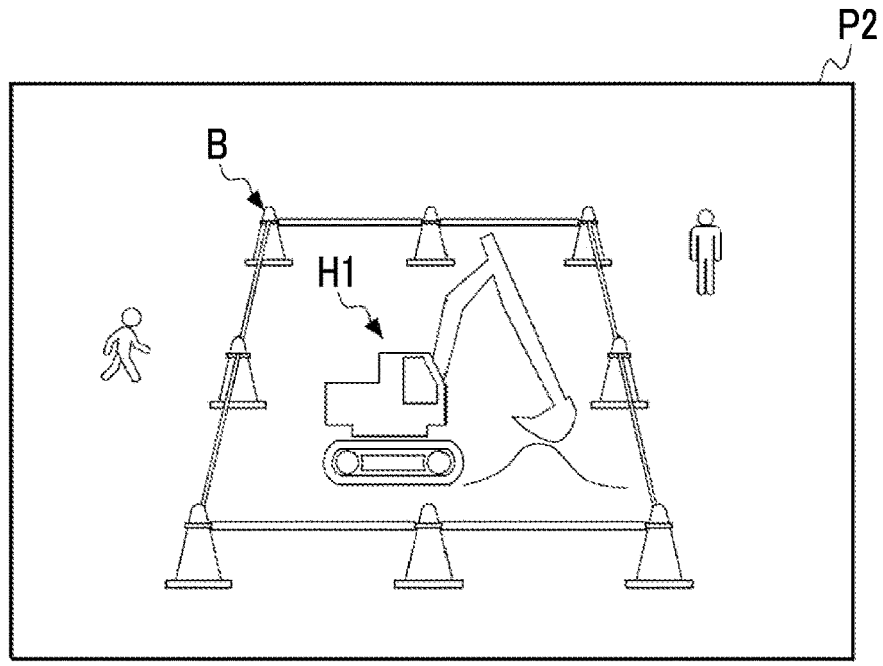
FIG. 18 is a conceptual diagram showing a modification example of object detection.

In each of the embodiments described above and each of the modification examples described above, the heavy machine is detected as the object from the captured image, but the detected object is not limited to the heavy machine. For example, as shown in FIG. 18, a barricade B provided in the vicinity of the heavy machine H1 for ensuring safety may be detected. In addition, whether or not the barricade B is provided in the vicinity of the heavy machine H1 may be detected in a stepwise manner after the heavy machine H1 is detected. As in a case of the heavy machine, the various technologies described above can be applied to the detection of the barricade.

The technology of the present disclosure is particularly useful in a case in which the teacher image cannot be easily obtained, such as the heavy machine at the construction site, the barricade, or the like.

Figure 19:
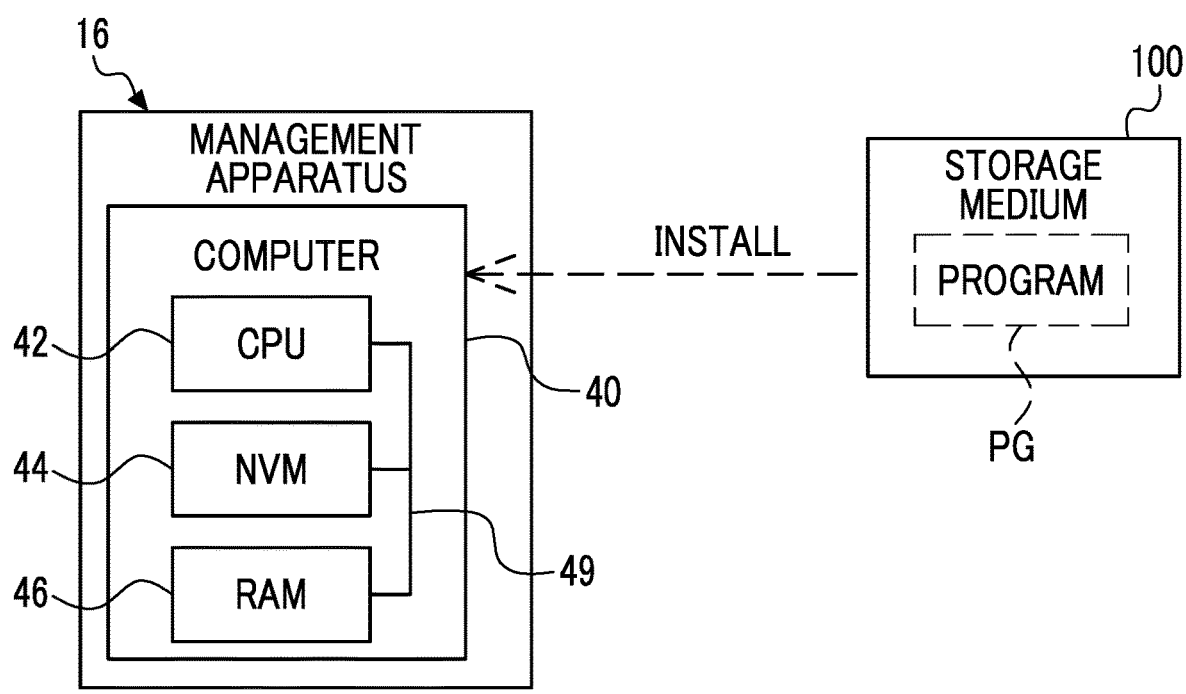
FIG. 19 is a block diagram showing an example of an aspect in which a program stored in a storage medium is installed in a computer.

In addition, in each of the embodiments described above, the program PG for the surveillance process is stored in the NVM 44 (see FIG. 2), but the technology of the present disclosure is not limited to this. As shown in FIG. 19 as an example, the program PG may be stored in any portable storage medium 100 that is a non-transitory storage medium, such as an SSD or a USB memory. In such a case, the program PG stored in the storage medium 100 is installed in the computer 40, and the CPU 42 executes the surveillance process described above according to the program PG.

In addition, the program PG may be stored in a storage device of another computer or server device connected to the computer 40 via a communication network (not shown), and the program PG may be downloaded and installed on the computer 40 according to a request from the management apparatus 16. In such a case, the surveillance process is executed by the computer 40 according to the installed program PG.

The following various processors can be used as a hardware resource for executing the surveillance process described above. Examples of the processor include a CPU which is a general-purpose processor functioning as the hardware resource for executing the surveillance process by executing software, that is, the program PG. Examples of the processor also include a dedicated electric circuit which is a processor having a circuit configuration specially designed for executing specific processing, such as an FPGA, a PLD, or an ASIC. The memory is built in or connected to any processor, and any processor executes the surveillance process by using the memory.

The hardware resource for executing the surveillance process may be configured by using one of these various processors, or may be configured by using a combination (for example, a combination of a plurality of FPGAs or a combination of a CPU and an FPGA) of two or more processors of the same type or different types. Also, the hardware resource for executing the surveillance process may be one processor.

A first example in which the hardware resource is configured by using one processor is a form in which one processor is configured by using a combination of one or more CPUs and software, and the processor functions as the hardware resource for executing the surveillance process, as represented by a computer, such as a client and a server. Secondly, as represented by SoC, there is a form in which a processor that realizes the functions of the entire system including a plurality of hardware resource for executing the surveillance process with one IC chip is used. In this way, the surveillance process is realized by using one or more of the various processors described above as the hardware resource.

Further, as the hardware structures of these various processors, more specifically, an electric circuit in which circuit elements, such as semiconductor elements, are combined can be used.

In addition, the surveillance process described above is merely an example. Therefore, it is needless to say that unnecessary steps may be deleted, new steps may be added, or the processing order may be changed within a range that does not deviate from the gist.

The described contents and the shown contents are the detailed description of the parts according to the technology of the present disclosure, and are merely examples of the technology of the present disclosure. For example, the description of the configuration, the function, the action, and the effect are the description of examples of the configuration, the function, the action, and the effect of the parts according to the technology of the present disclosure. Accordingly, it is needless to say that unnecessary parts may be deleted, new elements may be added, or replacements may be made with respect to the described contents and the shown contents within a range that does not deviate from the gist of the technology of the present disclosure. In addition, in order to avoid complications and facilitate understanding of the parts according to the technology of the present disclosure, the description of common technical knowledge or the like, which does not particularly require the description for enabling the implementation of the technology of the present disclosure, is omitted in the described contents and the shown contents.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All documents, patent applications, and technical standards described in the present specification are incorporated into the present specification by reference to the same extent as in a case in which the individual documents, patent applications, and technical standards are specifically and individually stated to be described by reference.

What is claimed is:

1. A control apparatus comprising:
a processor that controls a surveillance camera,
wherein the processor
performs switching between a first surveillance mode in which the surveillance camera is caused to perform imaging to acquire a first captured image and an imaging range is changed according to a given instruction, and a second surveillance mode in which the surveillance camera is caused to perform imaging to acquire a second captured image, a trained model that has been trained through machine learning is used to detect an object that appears in the second captured image, and the imaging range is changed according to a detection result, and
outputs the first captured image acquired in the first surveillance mode as a teacher image for the machine learning according to a manual operation performed with respect to the surveillance camera,
wherein the manual operation is a switching operation from the second surveillance mode to the first surveillance mode, and
the processor outputs the first captured image acquired in the first surveillance mode after switching from the second surveillance mode to the first surveillance mode as the teacher image.

2. The control apparatus according to claim 1,
wherein the surveillance camera is able to change the imaging range by changing at least one of a pan, a tilt, or a zoom, and
the switching operation is an operation of changing at least one of the pan, the tilt, or the zoom in the second surveillance mode.

3. The control apparatus according to claim 1,
wherein the processor outputs the first captured image as the teacher image according to a given output instruction after switching from the second surveillance mode to the first surveillance mode.

4. The control apparatus according to claim 1,
wherein the processor
outputs the second captured image acquired in the second surveillance mode before switching as the teacher image by adding a determination result that is not suitable for detection of the object to the second captured image, and
outputs the first captured image acquired in the first surveillance mode after switching as the teacher image by adding a determination result that is suitable for detection of the object to the first captured image.

5. The control apparatus according to claim 4,
wherein, in a case in which an operation is not performed for a certain time in the first surveillance mode after switching from the second surveillance mode to the first surveillance mode, the processor performs switching to the second surveillance mode.

6. The control apparatus according to claim 5,
wherein, in a case in which the manual operation is performed after elapse of a certain time from a previous manual operation after switching from the first surveillance mode to the second surveillance mode, the processor does not output the second captured image as the teacher image.

7. The control apparatus according to claim 1,
wherein the processor decides a position of an object that appears in the teacher image according to a given instruction, and adds positional information of the decided object in the teacher image to the teacher image.

8. A control apparatus, comprising:
a processor that controls a surveillance camera,
wherein the processor
performs switching between a first surveillance mode in which the surveillance camera is caused to perform imaging to acquire a first captured image and an imaging range is changed according to a given instruction, and a second surveillance mode in which the surveillance camera is caused to perform imaging to acquire a second captured image, a trained model that has been trained through machine learning is used to detect an object that appears in the second captured image, and the imaging range is changed according to a detection result, and
outputs the first captured image acquired in the first surveillance mode as a teacher image for the machine learning,
wherein the processor detects an object that appears in the teacher image, and adds positional information of the detected object in the teacher image to the teacher image, and
wherein the processor makes a detection standard for object detection in a case of detecting the object that appears in the teacher image lower than a detection standard for object detection in a case of detecting the object that appears in the second captured image.

9. A control apparatus, comprising:
a processor that controls a surveillance camera,
wherein the processor
performs switching between a first surveillance mode in which the surveillance camera is caused to perform imaging to acquire a first captured image and an imaging range is changed according to a given instruction, and a second surveillance mode in which the surveillance camera is caused to perform imaging to acquire a second captured image, a trained model that has been trained through machine learning is used to detect an object that appears in the second captured image, and the imaging range is changed according to a detection result, and
outputs the first captured image acquired in the first surveillance mode as a teacher image for the machine learning,
wherein the processor outputs an expansion image generated by performing an expansion process with respect to the teacher image as the teacher image, in addition to the teacher image.

10. The control apparatus according to claim 9,
wherein the expansion process is at least any one process of inversion, reduction, addition of noise, or style change using deep learning.

11. A control method comprising:
enabling switching between a first surveillance mode in which a surveillance camera is caused to perform imaging to acquire a first captured image and an imaging range is changed according to a given instruction, and a second surveillance mode in which the surveillance camera is caused to perform imaging to acquire a second captured image, a trained model that has been trained through machine learning is used to detect an object that appears in the second captured image, and the imaging range is changed according to a detection result; and
outputting the first captured image acquired in the first surveillance mode as a teacher image for the machine learning according to a manual operation performed with respect to the surveillance camera,
wherein the manual operation is a switching operation from the second surveillance mode to the first surveillance mode, and
the first captured image acquired in the first surveillance mode is outputted as the teacher image after switching from the second surveillance mode to the first surveillance mode.

12. A non-transitory computer-readable storage medium storing a program causing a computer to execute a process comprising:
enabling switching between a first surveillance mode in which a surveillance camera is caused to perform imaging to acquire a first captured image and an imaging range is changed according to a given instruction, and a second surveillance mode in which the surveillance camera is caused to perform imaging to acquire a second captured image, a trained model that has been trained through machine learning is used to detect an object that appears in the second captured image, and the imaging range is changed according to a detection result; and
outputting the first captured image acquired in the first surveillance mode as a teacher image for the machine learning according to a manual operation performed with respect to the surveillance camera,
wherein the manual operation is a switching operation from the second surveillance mode to the first surveillance mode, and
the first captured image acquired in the first surveillance mode is outputted as the teacher image after switching from the second surveillance mode to the first surveillance mode.

13. A control method comprising:
enabling switching between a first surveillance mode in which a surveillance camera is caused to perform imaging to acquire a first captured image and an imaging range is changed according to a given instruction, and a second surveillance mode in which the surveillance camera is caused to perform imaging to acquire a second captured image, a trained model that has been trained through machine learning is used to detect an object that appears in the second captured image, and the imaging range is changed according to a detection result;
outputting the first captured image acquired in the first surveillance mode as a teacher image for the machine learning;
detecting an object that appears in the teacher image, and adding positional information of the detected object in the teacher image to the teacher image; and
making a detection standard for object detection in a case of detecting the object that appears in the teacher image lower than a detection standard for object detection in a case of detecting the object that appears in the second captured image.

14. A control method comprising:
enabling switching between a first surveillance mode in which a surveillance camera is caused to perform imaging to acquire a first captured image and an imaging range is changed according to a given instruction, and a second surveillance mode in which the surveillance camera is caused to perform imaging to acquire a second captured image, a trained model that has been trained through machine learning is used to detect an object that appears in the second captured image, and the imaging range is changed according to a detection result;

outputting the first captured image acquired in the first surveillance mode as a teacher image for the machine learning; and outputting an expansion image generated by performing an expansion process with respect to the teacher image as the teacher image, in addition to the teacher image.

15. A non-transitory computer-readable storage medium storing a program causing a computer to execute a process comprising:

enabling switching between a first surveillance mode in which a surveillance camera is caused to perform imaging to acquire a first captured image and an imaging range is changed according to a given instruction, and a second surveillance mode in which the surveillance camera is caused to perform imaging to acquire a second captured image, a trained model that has been trained through machine learning is used to detect an object that appears in the second captured image, and the imaging range is changed according to a detection result;

outputting the first captured image acquired in the first surveillance mode as a teacher image for the machine learning;

detecting an object that appears in the teacher image, and adding positional information of the detected object in the teacher image to the teacher image; and making a detection standard for object detection in a case of detecting the object that appears in the teacher image lower than a detection standard for object detection in a case of detecting the object that appears in the second captured image.

16. A non-transitory computer-readable storage medium storing a program causing a computer to execute a process comprising:

enabling switching between a first surveillance mode in which a surveillance camera is caused to perform imaging to acquire a first captured image and an imaging range is changed according to a given instruction, and a second surveillance mode in which the surveillance camera is caused to perform imaging to acquire a second captured image, a trained model that has been trained through machine learning is used to detect an object that appears in the second captured image, and the imaging range is changed according to a detection result;

outputting the first captured image acquired in the first surveillance mode as a teacher image for the machine learning; and outputting an expansion image generated by performing an expansion process with respect to the teacher image as the teacher image, in addition to the teacher image.

\* \* \* \* \*